(12) United States Patent
Ooba et al.

(10) Patent No.: US 10,832,103 B2
(45) Date of Patent: Nov. 10, 2020

(54) PRINT CONTROL APPARATUS, IMAGE FORMING APPARATUS AND METHOD TO SELECT SHEET TYPE AND TEST CHART FOR PERFORMING DIFFERENT TYPES OF TEST PRINTING

(71) Applicant: CANON KABUSHIKI KAISHA, Tokyo (JP)

(72) Inventors: Hideaki Ooba, Yokohama (JP); Yuzo Harano, Sagamihara (JP); Aya Ito, Tokyo (JP); Junichi Yamakawa, Kashiwa (JP); Yusuke Kimura, Abiko (JP); Nobuhiro Kawamura, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/971,439

(22) Filed: May 4, 2018

(65) Prior Publication Data
US 2018/0330209 A1 Nov. 15, 2018

(30) Foreign Application Priority Data
May 9, 2017 (JP) ................................ 2017-093379

(51) Int. Cl.
*G06K 15/02* (2006.01)
*G06K 15/16* (2006.01)
(Continued)

(52) U.S. Cl.
CPC ......... *G06K 15/024* (2013.01); *G06K 15/027* (2013.01); *G06K 15/16* (2013.01);
(Continued)

(58) Field of Classification Search
None
See application file for complete search history.

(56) References Cited

U.S. PATENT DOCUMENTS

2009/0009552 A1* 1/2009 Aritomi ................. G06K 15/02
347/19
2009/0225343 A1* 9/2009 Tominaga ............. G06F 3/1204
358/1.9
(Continued)

FOREIGN PATENT DOCUMENTS

CN 1383058 A 12/2002
CN 1881173 A 12/2006
(Continued)

OTHER PUBLICATIONS

Machine Translation in English of JP Pub 2005-081762 to Akiro et al.*

*Primary Examiner* — Benny Q Tieu
*Assistant Examiner* — Haris Sabah
(74) *Attorney, Agent, or Firm* — Canon U.S.A., Inc. IP Division

(57) ABSTRACT

A print control apparatus capable of communicating with a printing apparatus, including a sheet holding unit in which a sheet to be used for printing is held, for printing an image on the sheet held in the sheet holding unit includes storage configured to store a type of a sheet, an image, and a setting value of the printing apparatus in association with each other, selects a type of a sheet to be used for printing by the printing apparatus, selects an image to be printed by the printing apparatus, and sets the setting value stored in the storage in association with the selected type of the sheet and the selected image.

15 Claims, 19 Drawing Sheets

(51) Int. Cl.
G06K 9/03 (2006.01)
G06F 3/12 (2006.01)
G03G 15/00 (2006.01)
G06K 7/00 (2006.01)

(52) U.S. Cl.
CPC ..... G06K 15/1809 (2013.01); G06K 15/1868 (2013.01); *G03G 15/5025* (2013.01); *G03G 2215/00751* (2013.01); *G06F 3/1256* (2013.01); *G06K 7/00* (2013.01); *G06K 9/036* (2013.01)

(56) References Cited

U.S. PATENT DOCUMENTS

2012/0050806 A1* 3/2012 Fukuda .............. H04N 1/00244
358/1.15
2015/0062651 A1* 3/2015 Yano .................. G06K 15/4065
358/1.18
2015/0294200 A1* 10/2015 Ito ...................... G06K 15/1809
358/1.15

FOREIGN PATENT DOCUMENTS

| CN | 101135959 A | 3/2008 |
| JP | 2005-81762 A | 3/2005 |
| JP | 2011-086121 A | 4/2011 |

* cited by examiner

FIG.6B

TOP SCREEN — 401

| DEVICE | ADJUSTMENT | — 403, 404

- ADJUSTMENT OF IMAGE POSITION — [NOT ADJUSTED]
- CURL CORRECTION — [NOT ADJUSTED]
- ADJUSTMENT OF SADDLE FOLDING POSITION — [0 mm]
- ADJUSTMENT OF CREEP CORRECTION AMOUNT — [0 mm]
- ADJUSTMENT OF SADDLE STITCH FOLDING POSITION — [0 mm]
- CHANGE IN SADDLE STITCH POSITION — [0 mm]
- ADJUSTMENT OF SECONDARY TRANSFER VOLTAGE — [NOT ADJUSTED]
- ADJUSTMENT OF FRONT END PORTION SECONDARY TRANSFER VOLTAGE — [NOT ADJUSTED]
- ADJUSTMENT OF SECONDARY TRANSFER STATIC ELIMINATION BIAS — [NOT ADJUSTED]
- ADJUSTMENT OF PRIMARY TRANSFER VOLTAGE — [NOT ADJUSTED]
- ADJUSTMENT OF GLOSSINESS/BLACK GRADE — [NOT ADJUSTED]

417, 418, 419, 420, 402

| NAME / SIZE | BASIS WEIGHT |
|---|---|
| PLAIN PAPER 1 / A4 | 100 gsm |
| TWO-SIDE COATED PAPER / A4 | 105 gsm |
| ONE-SIDE COATED PAPER / A4 | 105 gsm |
| OHP PAPER / A4 | 80 gsm |
| RECYCLED PAPER / A4 | 200 gsm |
| TRANSPARENT PAPER / A4 | 80 gsm |
| COLORED PAPER / A4 | 127 gsm |
| THICK PAPER 1 / A4 | 300 gsm |
| ONE-SIDE COATED PAPER / A4 | 105 gsm |
| OHP PAPER / A4 | 80 gsm |
| RECYCLED PAPER / A4 | 200 gsm |

| SHEET NAME | FILE NAME | SETTING VALUE OF ADJUSTMENT ITEM |
|---|---|---|
| PLAIN PAPER 1 | C:¥abc¥user_testchart1.pdf | 2 |
| PLAIN PAPER 1 | C:¥abc¥user_testchart2.pdf | 1 |
| PLAIN PAPER 2 | CUSTOMER_DATA.pdf | -1 |
| THICK PAPER 1 | aaa.pdf | 3 |
| THICK PAPER 1 | bbb.pdf | 4 |

1701, 1702, 1703, 1704, 1705, 1706

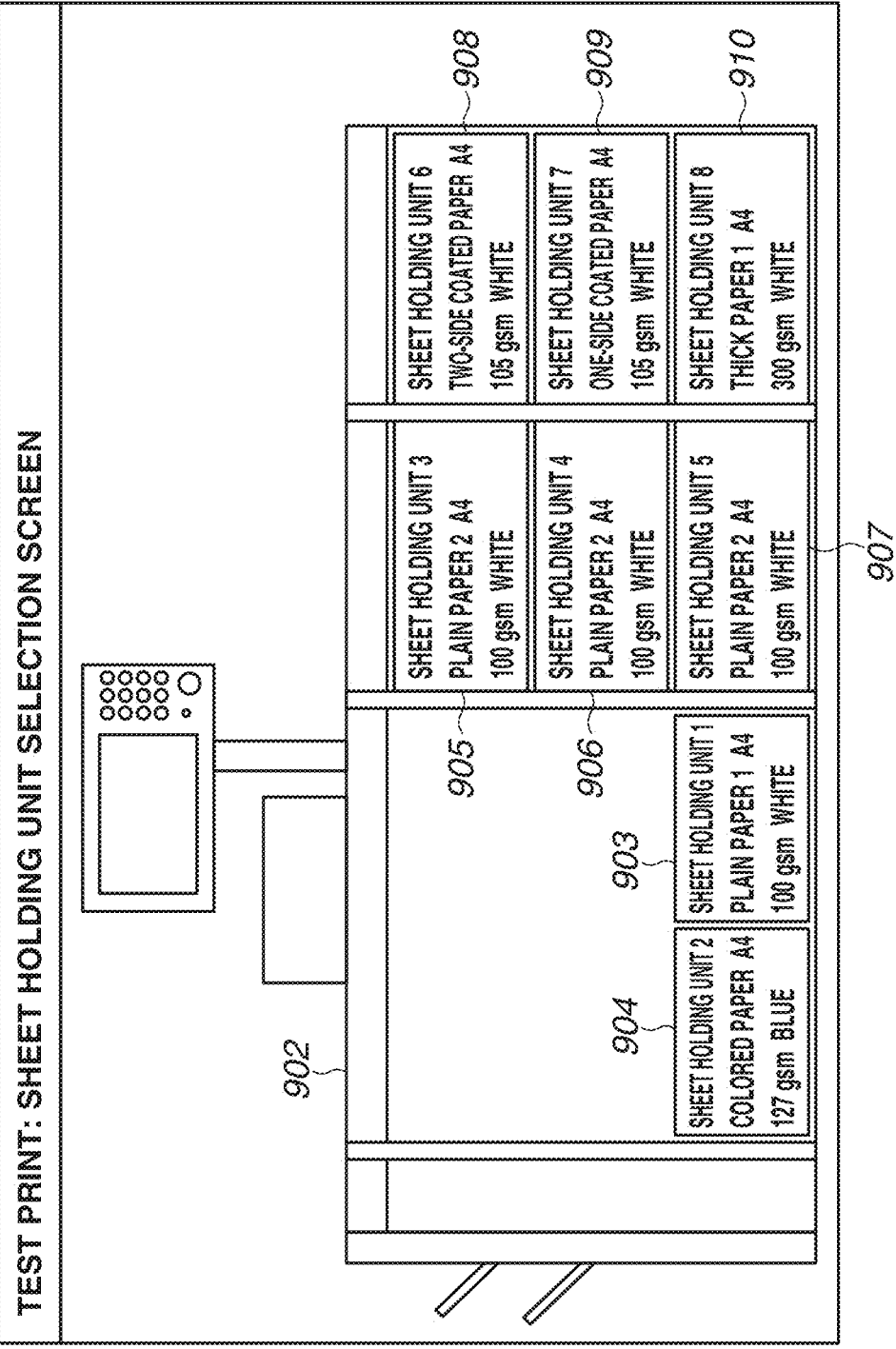

| ADJUSTMENT ITEM NAME | PRESENCE OR ABSENCE OF DIFFERENCE IN TEST PRINTING RESULT |
|---|---|
| ADJUSTMENT OF IMAGE POSITION | ○ |
| CURL CORRECTION | × |
| ADJUSTMENT OF SADDLE FOLDING POSITION | ○ |
| ADJUSTMENT OF CREEP CORRECTION AMOUNT | ○ |
| ADJUSTMENT OF SADDLE STITCH FOLDING POSITION | ○ |
| CHANGE IN SADDLE STITCH POSITION | ○ |
| ADJUSTMENT OF SECONDARY TRANSFER VOLTAGE | ○ |
| ADJUSTMENT OF FRONT END PORTION SECONDARY TRANSFER VOLTAGE | ○ |
| ADJUSTMENT OF SECONDARY TRANSFER STATIC ELIMINATION BIAS | ○ |
| ADJUSTMENT OF GLOSSINESS/BLACK GRADE | ○ |

FIG.15

ADJUSTMENT OF GLOSSINESS/BLACK GRADE (1801)

- GLOSSINESS

[−]   −4 . . . | . . . +4   [0]   [+]

- BLACK GRADE

[−]   −4 . . . | . . . +4   [0]   [+]

(TWO VALUES ARE LINKED TOGETHER. SETTING OF BLACK GRADE IS INVALID FOR OHP FILM, COATED PAPER, AND VELLUM PAPER.)

TEST CHART:  BUILT-IN TEST CHART 1 ▼     [TEST PRINT]
             BUILT-IN TEST CHART 2
             C:¥abc¥user_testchart1.pdf
FILE PATH:   C:¥abc¥user_testchart2.pdf   [ADD]
                                          1802

[CANCEL]    [OK]

FIG.16

TOP SCREEN — 1501

| DEVICE | ADJUSTMENT |

- ADJUSTMENT OF IMAGE POSITION — 1503
- CURL CORRECTION — 1506, BUILT-IN TEST CHART 1 — 1509, TEST PRINT — 1511
- ADJUSTMENT OF SADDLE FOLDING POSITION — BUILT-IN TEST CHART 2, TEST PRINT
- ADJUSTMENT OF CREEP CORRECTION AMOUNT — TEST PRINT
- ADJUSTMENT OF SADDLE STITCH FOLDING POSITION — 1502, 1507, 1512, TEST PRINT — 1513
- CHANGE IN SADDLE STITCH POSITION — 1504
- ADJUSTMENT OF SECONDARY TRANSFER VOLTAGE — C:¥abc¥test1.pdf — 1508, TEST PRINT — 1514
- ADJUSTMENT OF FRONT END PORTION SECONDARY TRANSFER VOLTAGE — TEST PRINT
- ADJUSTMENT OF SECONDARY TRANSFER STATIC ELIMINATION BIAS — TEST PRINT
- ADJUSTMENT OF PRIMARY TRANSFER VOLTAGE — TEST PRINT
- ADJUSTMENT OF GLOSSINESS/BLACK GRADE — 1505, 1510, TEST PRINT — 1515

Dropdown list:
- BUILT-IN TEST CHART 1
- BUILT-IN TEST CHART 2
- C:¥abc¥user_testchart1.pdf
- C:¥abd¥user_testchart2.pdf
- CUSTOMER_DATA.pdf
- aaa.pdf
- bbb.pdf

| NAME SIZE | BASIS WEIGHT |
|---|---|
| PLAIN PAPER 1<br>A4 | 100 gsm |
| TWO-SIDE COATED PAPER_1<br>A4 | 300 gsm |
| ONE-SIDE COATED PAPER_1<br>A4 | 250 gsm |
| OHP PAPER<br>A4 | 80 gsm |
| RECYCLED PAPER<br>A4 | 200 gsm |
| TRANSPARENT PAPER<br>A4 | 80 gsm |
| COLORED PAPER<br>A4 | 127 gsm |
| THICK PAPER 1<br>A4 | 300 gsm |
| ONE-SIDE COATED PAPER_2<br>A4 | 250 gsm |
| OHP PAPER<br>A4 | 80 gsm |
| RECYCLED PAPER<br>A4 | 200 gsm |

FIG.18

| SHEET LIST SCREEN | | | | | | | |
|---|---|---|---|---|---|---|---|
| SHEET NAME | BASIS WEIGHT | SIZE | WIDTH | HEIGHT | SURFACE PROPERTY | FEATURE | COLOR |
| TWO-SIDE COATED PAPER_1 | 300 | A4 | 2970 | 2100 | TWO-SIDE COATED | NORMAL | WHITE |
| TWO-SIDE COATED PAPER_2 | 300 | A3 | 2970 | 4200 | TWO-SIDE COATED | NORMAL | WHITE |
| TWO-SIDE COATED PAPER_3 | 300 | A3 | 2970 | 4200 | TWO-SIDE COATED | NORMAL | CREAM |
| TWO-SIDE COATED PAPER_4 | 300 | A4 | 2970 | 2100 | TWO-SIDE COATED | PUNCHED PAPER | WHITE |
| ONE-SIDE COATED PAPER_1 | 250 | A4 | 2970 | 2100 | ONE-SIDE COATED | NORMAL | WHITE |
| ONE-SIDE COATED PAPER_2 | 250 | A3 | 2970 | 4200 | ONE-SIDE COATED | NORMAL | WHITE |
| ONE-SIDE COATED PAPER_3 | 250 | B4 | 2570 | 3640 | ONE-SIDE COATED | NORMAL | YELLOW |
| ONE-SIDE COATED PAPER_4 | 250 | A4 | 2970 | 2100 | ONE-SIDE COATED | NORMAL | YELLOW |
| ONE-SIDE COATED PAPER_5 | 250 | A3 | 2970 | 4200 | ONE-SIDE COATED | NORMAL | YELLOW |
| ONE-SIDE COATED PAPER_6 | 250 | B4 | 2570 | 3640 | ONE-SIDE COATED | NORMAL | WHITE |
| PLAIN PAPER 1 | 100 | A4 | 2970 | 2100 | PLAIN PAPER | NORMAL | WHITE |

CANCEL    OK

PRINT CONTROL APPARATUS, IMAGE FORMING APPARATUS AND METHOD TO SELECT SHEET TYPE AND TEST CHART FOR PERFORMING DIFFERENT TYPES OF TEST PRINTING

BACKGROUND OF THE INVENTION

Field of the Invention

The present disclosure relates to a print control apparatus, a printing apparatus, an image forming system, a control method for controlling a print control apparatus, and a recording medium.

Description of the Related Art

To obtain a desired print product, a printing apparatus such as a digital multifunction peripheral for performing printing based on image data can set, with respect to each sheet, an adjustment item for adjusting a printing result (the finish of a print product).

Then, in order for a user to confirm what printing result is to be obtained when the adjustment item is set, the printing apparatus prints a test chart, which is image data registered in the printing apparatus to adjust the finish of a print product.

In the publication of Japanese Patent Application Laid-Open No. 2005-81762, a test chart specified by a user is input from an external apparatus to a printing apparatus in addition to a test chart registered in advance, and the printing apparatus sets an identifier for the test chart specified by the user and saves the set identifier. Consequently, when a test chart specified by the user is printed, it is possible to select a test chart specified by the user and received from an external apparatus in addition to a built-in test chart registered as standard.

The user sets an adjustment item for a sheet specified by the user and prints a test chart on the sheet (test printing). Then, the user changes the setting of the adjustment item for the same sheet and repeats the test printing on the sheet, thereby examining a print setting with which a desired print product can be obtained. Consequently, based on the print setting with which the desired print product can be obtained, the user prints an image based on image data on a sheet.

Some user may wish to store, for example, the setting of a sheet and the setting of an adjustment item regarding an arbitrary test chart as test information, and then perform printing using the same test information on another occasion. Alternatively, the user may wish to read the same test information and set the adjustment item in the read test information in the middle on another occasion.

In the configuration of the publication of Japanese Patent Application Laid-Open No. 2005-81762, a test chart specified by the user is input, and an identifier is set and saved. However, various parameters used to print an image based on image data on a sheet are not saved. Thus, to use the same adjustment item when using the same sheet and the same test chart on another occasion, it is necessary to adjust the adjustment item all over again.

SUMMARY OF THE INVENTION

The present disclosure is directed to, after test information is stored and in a case where printing is performed using the same test information on another occasion or a case where a user wishes to read the same test information and set an adjustment item in the middle on another occasion, saving the trouble of adjusting the adjustment item.

A print control apparatus that is capable of communicating with a printing apparatus, including a sheet holding unit in which a sheet to be used for printing is stored, for printing an image on the sheet stored in the sheet holding unit includes storage configured to store a type of a sheet, an image, and a setting value of the printing apparatus in association with each other, and at least one processor which causes the print control apparatus to select a type of a sheet to be used for printing by the printing apparatus, select an image to be printed by the printing apparatus, and set the setting value stored in the storage in association with the selected type of the sheet and the selected image.

Further features of the present disclosure will become apparent from the following description of exemplary embodiments with reference to the attached drawings.

BRIEF DESCRIPTION OF THE DRAWINGS

FIG. 11 is a diagram illustrating an example of a test chart list.

FIG. 12 is a diagram illustrating a selection screen for a sheet holding unit with which test printing is to be performed.

FIG. 13 is a diagram illustrating test printing results of each adjustment item using different test charts.

FIG. 15 is a diagram illustrating an adjustment screen for test information.

FIG. 16 is a diagram illustrating an adjustment screen for test information.

FIG. 18 is a diagram illustrating a sheet list.

DESCRIPTION OF THE EMBODIMENTS

Figure 1:
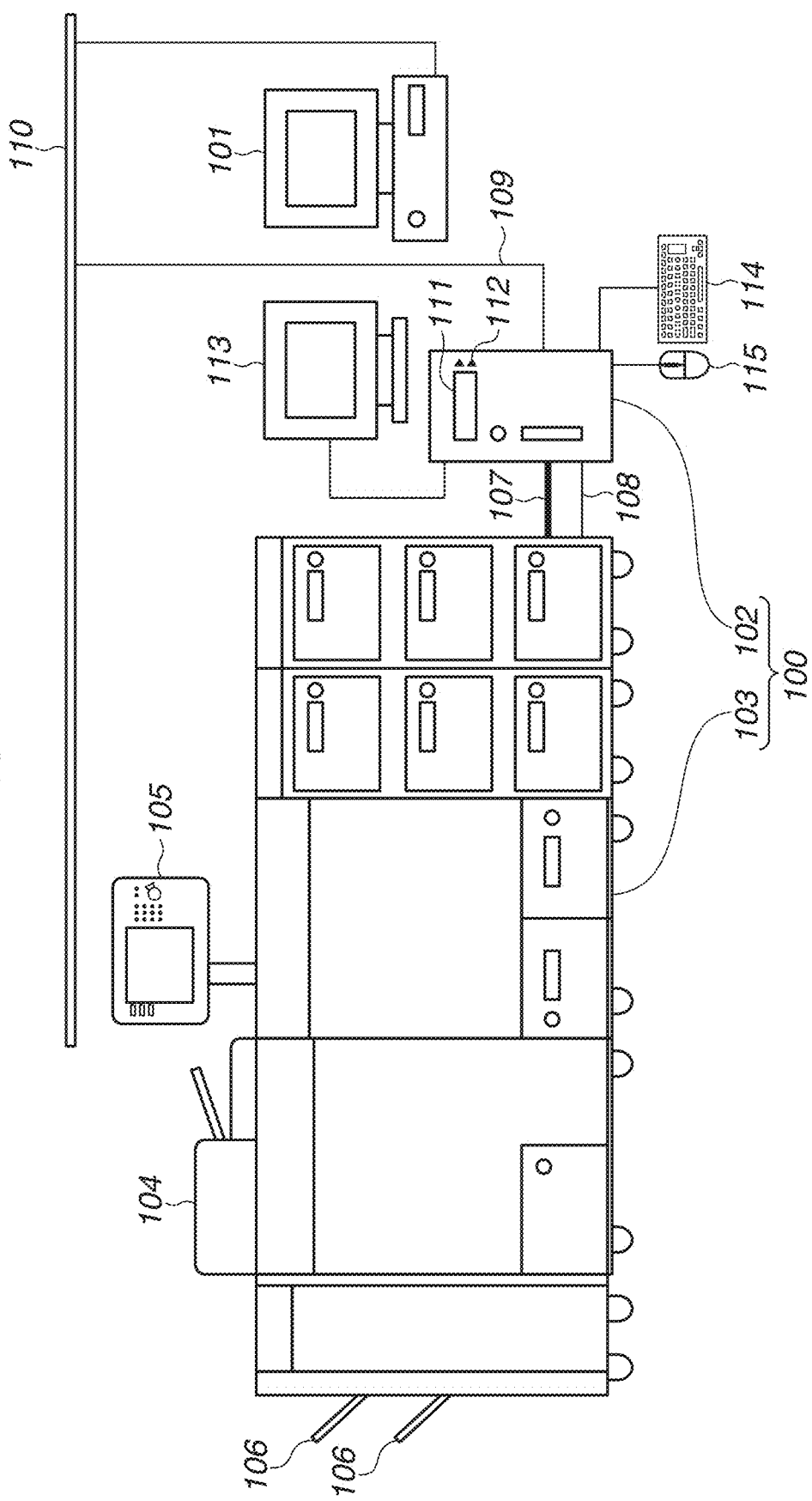
FIG. 1 is a block diagram illustrating a configuration of an image forming system.

A first exemplary embodiment is described below. FIG. 1 is a block diagram illustrating the configuration of an image forming system 100. In FIG. 1, the image forming system 100 includes a printing apparatus 103 and a print control apparatus 102.

Then, the image forming system 100 is connected to a client computer 101 so that the image forming system 100 can communicate with the client computer 101. The client computer 101 and the print control apparatus 102 are connected together via a local area network (LAN) 110 using an Ethernet (registered trademark) cable 109 so that the client computer 101 and the print control apparatus 102 can communicate with each other. Further, the print control apparatus 102 and the printing apparatus 103 are connected together via an image video cable 107 and a control cable 108.

In the present exemplary embodiment, the printing apparatus 103 is not directly connected to the LAN 110. The printing apparatus 103 and the client computer 101 communicate with each other via the print control apparatus 102. Alternatively, the printing apparatus 103 may be directly connected to the LAN 110.

The client computer 101 starts an application and gives a print instruction to the image forming system 100.

The print control apparatus 102 performs image processing with the printing apparatus 103. The printing apparatus 103 is a multifunction peripheral having various functions. The printing apparatus 103 can not only perform image processing according to an instruction from the client computer 101 or the print control apparatus 102, but can also copy data read from a scanner 213 or transmit the data to a shared folder.

When the scanner 213 scans an image, an operation unit 105 receives various instructions from a user through various keys. Further, the operation unit 105 displays various pieces of information such as a scanning state on a panel. A post-processing device 106 receives a sheet on which an image is formed, performs post-processing on the sheet, and discharges the sheet.

A display unit 111 displays information about the print control apparatus 102. An operation button unit 112 is a hardware operation button of the print control apparatus 102. The operation button unit 112 is operated, thereby performing an operation regarding the information displayed on the display unit 111. The information displayed on the display unit 111 is used to display minimum required information (the operation of power supply or the confirmation of an Internet Protocol (IP) address) for operating the print control apparatus 102.

A display device 113 is a device such as a liquid crystal monitor included in the print control apparatus 102. A keyboard 114 and a pointer device 115 are used to operate the print control apparatus 102. In the present exemplary embodiment, the print control apparatus 102 and the printing apparatus 103 are separate apparatuses. Alternatively, the processing of the print control apparatus 102 may be included in the printing apparatus 103, and the print control apparatus 102 may not be physically placed. Yet alternatively, the display device 113 may be configured to have a position input function as in a touchpad and have the function of the pointer device 115.

Figure 2:
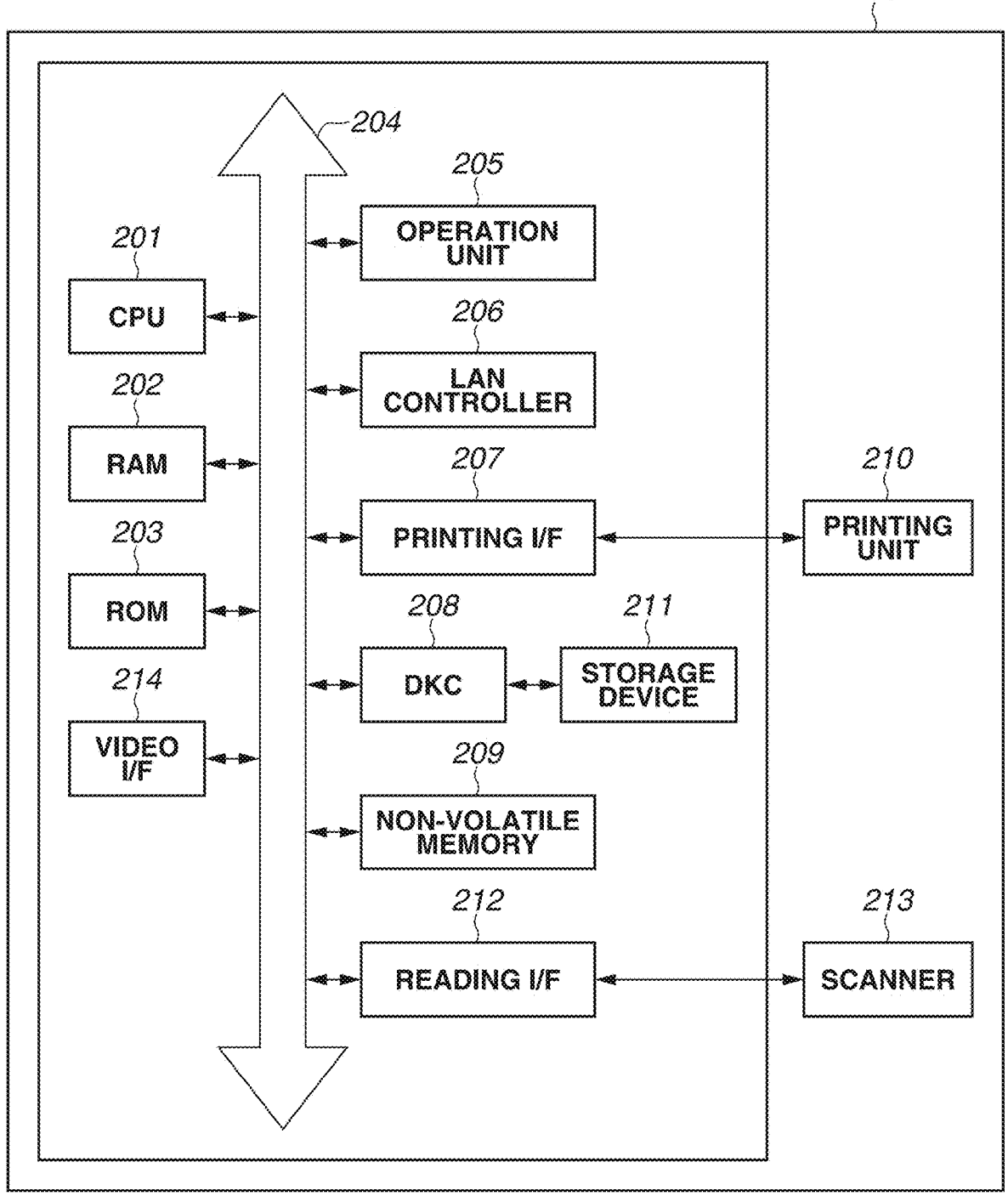
FIG. 2 is a block diagram illustrating a hardware configuration of a printing apparatus.

FIG. 2 is a block diagram illustrating a hardware configuration of the printing apparatus 103.

A central processing unit (CPU) 201 controls the operation of the entirety of the printing apparatus 103.

A LAN controller 206 is connected to the LAN 110. The CPU 201 can perform a communication process with the print control apparatus 102 via the LAN controller 206.

A random-access memory (RAM) 202 functions as a main memory or a work area for the CPU 201.

A storage device 211 is composed of a hard disk drive (HDD), a solid-state drive (SSD), or an integrated circuit (IC) card. The storage device 211 is used as a job storage area for storing an application program, font data, and form data, temporarily spooling a print job, or externally controlling a spooled job. A program stored in the storage device 211 is loaded into the RAM 202 and executed by the CPU 201.

Further, the storage device 211 is also used as a box data storage area. The storage device 211 holds image data read from the scanner 213 or image data of a print job as box data, references the image data, or prints the image data. In the present exemplary embodiment, an HDD is used as the storage device 211 and holds various logs such as a job log and an image log.

A disk controller (DKC) 208 controls access to the storage device 211. A read-only memory (ROM) 203 functions as a boot ROM and stores a boot program for the printing apparatus 103.

An operation unit 205 includes a software key or a hardware key. Various pieces of information are input to the operation unit 205 by the user operating the software key or the hardware key.

A non-volatile memory 209 stores various pieces of setting information set by a terminal via the operation unit 205 or a network.

A video interface (I/F) 214 receives image data from the print control apparatus 102.

The LAN controller 206 is connected to the LAN 110, and inputs and outputs image data and other information via the LAN 110.

A printing I/F 207 is connected to a printing unit (hereinafter, "printer engine") 210 and the CPU 201. The CPU 201 outputs an image signal as output information to the printer engine 210 via the printing I/F 207.

A reading I/F 212 is connected to the scanner 213 and the CPU 201. The CPU 201 controls an image signal input from the scanner 213 via the reading I/F 212.

The CPU 201, the RAM 202, the ROM 203, the video I/F 214, the operation unit 205, the LAN controller 206, the printing I/F 207, the DKC 208, the non-volatile memory 209, and the reading I/F 212 are connected to a system bus 204. The CPU 201 controls access to and from various devices via the system bus 204.

Figure 3:
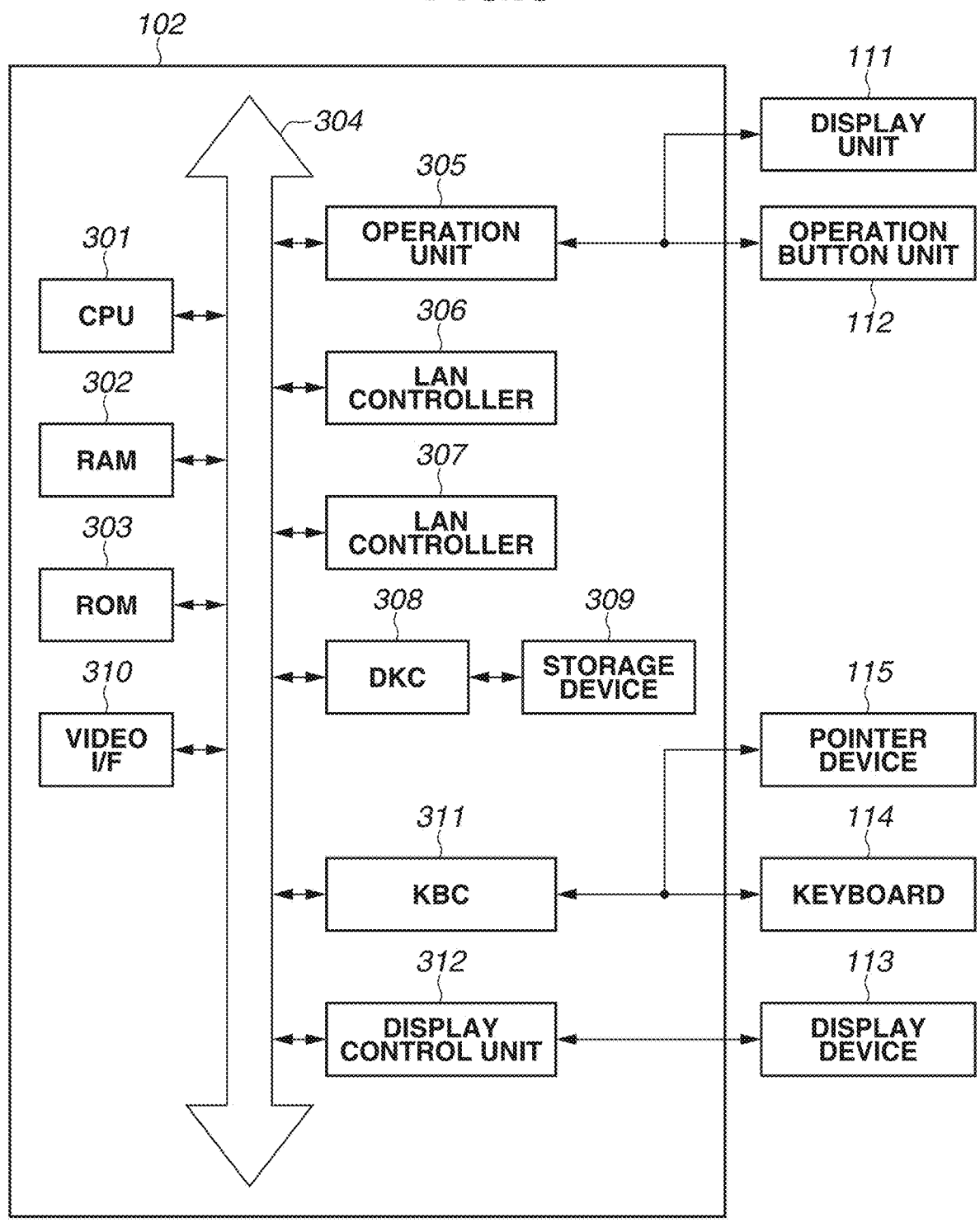
FIG. 3 is a block diagram illustrating a hardware configuration of a print control apparatus.

FIG. 3 is a block diagram illustrating the hardware configuration of the print control apparatus 102.

A CPU 301 controls the operation of the entirety of the print control apparatus 102. For example, the CPU 301 performs use control for controlling whether to make a sheet holding unit usable or unusable.

A LAN controller 306 is connected to the LAN 110. The CPU 201 can perform a communication process with the printing apparatus 103 via the LAN controller 306.

A LAN controller 307 is connected to the LAN 110. The CPU 201 can perform a communication process with the client computer 101 and the printing apparatus 103 on a network via the LAN controller 307.

A RAM 302 functions as a main memory or a work area for the CPU 301.

A storage device 309 is composed of an HDD, an SSD, or an IC card. The storage device 309 is used as a job storage area for storing an application program, font data, and form data, temporarily spooling a print job, or externally controlling a spooled job. A program stored in the storage device 309 is loaded into the RAM 302 and executed by the CPU 301.

The spooled job is subjected to a raster image processor (RIP) process. Then, the storage device 309 is used as a job storage area for saving RIP-processed image data again.

A DKC 308 controls access to the storage device 309. A ROM 303 functions as a boot ROM and stores a boot program for the printing apparatus 103.

An operation unit 305 includes the operation button unit 112 and the display unit 111. Various pieces of information are input to the operation unit 305 by the user operating the operation button unit 112. The input information is displayed on the display unit 111.

A video I/F 310 outputs RIP-processed image data to the printing apparatus 103. A keyboard controller (hereinafter, "KBC") 311 performs processing regarding the input of information from the keyboard 114 or the pointer device 115 such as a mouse (registered trademark).

A display control unit 312 includes a memory (hereinafter, a "video memory") therewithin. According to an instruction received from the CPU 301, the display control unit 312 holds image data in the video memory and outputs the held image data as a video signal to the display device 113.

The CPU 301, the RAM 302, the ROM 303, the video I/F 310, the operation unit 305, the LAN controller 306, the LAN controller 307, the DKC 308, the storage device 309, the KBC 311, and the display control unit 312 are connected to a system bus 304. The CPU 301 controls access to and from various devices via the system bus 304.

Figure 4:
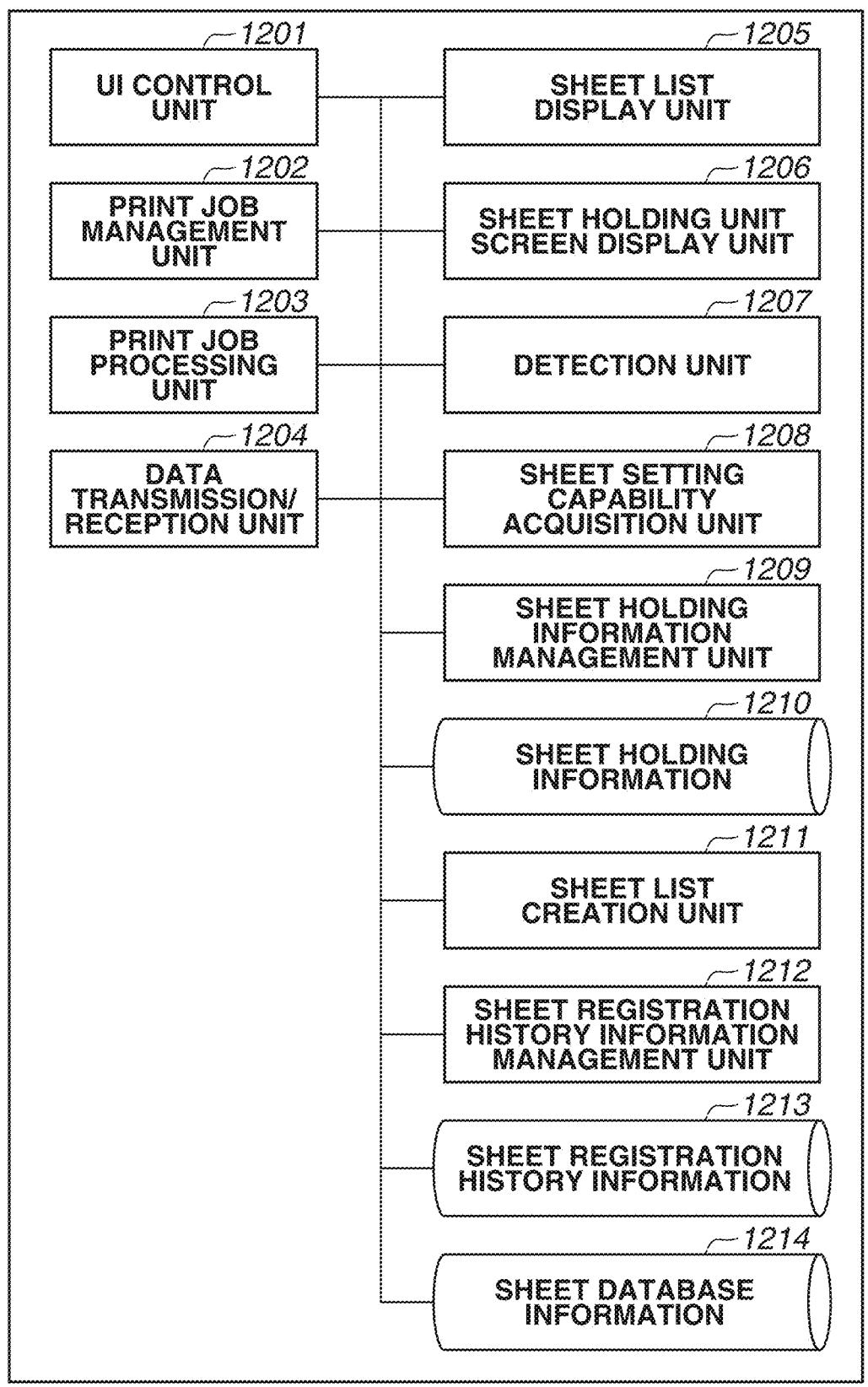
FIG. 4 is a block diagram illustrating a software configuration of the print control apparatus.

FIG. 4 is a block diagram illustrating the software configuration of the print control apparatus 102. These software modules are stored as programs in the storage device 309 and are loaded into the RAM 302 and executed by the CPU 301.

A user interface (UI) control unit 1201 controls display on the display unit 111 and the display device 113 via the operation unit 305 and the display control unit 312. Further, the UI control unit 1201 controls the input of various pieces of setting information set using the operation button unit 112, the keyboard 114, and the pointer device 115.

A print job management unit 1202 manages print job data received from the user. Specifically, the print job management unit 1202 performs the processes of calling print job data saved in the storage device 309, reflecting a change in a setting of a print job made by the user, and managing the history of printed jobs. A print job processing unit 1203 performs processing required for the execution of a printing process, such as the analysis of a print job received from the user, the generation of image data, and image compression and decompression.

A data transmission/reception unit 1204 manages the transmission and reception of various pieces of data to and from the printing apparatus 103. The data transmission/reception unit 1204 transmits print job data generated by the print job processing unit 1203 to the printing apparatus 103. Further, the data transmission/reception unit 1204 also manages the transmission and reception of data to and from the client computer 101, which is connected to the print control apparatus 102 via an external network.

A sheet list display unit 1205 displays sheet information as a sheet list on a top screen of a sheet management application displayed on the display device 113. The sheet management application is an application capable of managing the characteristics, such as the types, the sizes, and the basis weights, of sheets that can be used in the printing apparatus 103, and setting adjustment items for each sheet. The values of the adjustment items set here are recorded as sheet information.

The sheet list display unit 1205 switches the display of the display device 113 every time the sheet list as a display target is updated. In the present exemplary embodiment, using the sheet management application, the user can set which sheet holding unit a sheet is to be held in and which sheet information the sheet is based on.

A sheet list creation unit 1211 creates a sheet list to be displayed by the sheet list display unit 1205. The sheet list creation unit 1211 creates the sheet list to be displayed in descending order of the number of times the user registers sheet information in each sheet holding unit. The details of processing regarding the creation of the sheet list will be described below.

Sheet registration history information 1213 is information indicating which sheet holding units pieces of sheet information stored in a sheet database are registered in, and how many times the pieces of sheet information are registered in the sheet holding units. This information is used by the sheet list creation unit 1211 to create a sheet list.

A sheet registration history information management unit 1212 manages the sheet registration history information 1213. For example, according to the fact that the user selects sheet information from a sheet list and registers the sheet information in a sheet holding unit, the sheet registration history information management unit 1212 updates the sheet registration history information 1213. Sheet database information 1214 is a database for storing sheet information such as the types, the sizes, and the basis weights of sheets that can be used in the printing apparatus 103. This database is stored in the storage device 309.

In the sheet database information 1214, sheet information registered in advance as the product specifications of the printing apparatus 103 and also sheet information created by the user performing a predetermined operation using the sheet management application are stored. Further, the same information is also stored in the printing apparatus 103. Thus, if the database of either of the printing apparatus 103 and the print control apparatus 102 is updated, the database of the other is also updated via the data transmission/reception unit 1204.

Figure 6:
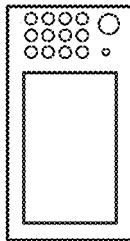
FIGS. 6A and 6B are diagrams each illustrating a screen of a sheet management application.

A sheet holding unit screen display unit 1206 controls the display of sheet holding unit buttons 406 to 413 in FIG. 6A. According to the fact that the user selects sheet information from a sheet list and registers the selected sheet information in a sheet holding unit, the sheet holding unit screen display unit 1206 displays the registered sheet information in a sheet holding unit button.

A detection unit 1207 detects a click operation using an operation unit such as the pointer device 115 on a top screen 401 of the sheet management application in FIGS. 6A and 6B. The detection unit 1207 detects that the pointer device 115 is clicked. The detection unit 1207 also acquires information regarding the position where the click is performed.

A sheet setting capability acquisition unit 1208 inquires of the printing apparatus 103 about whether a sheet having sheet information selected by the user can be set in each sheet holding unit. Further, the sheet setting capability acquisition unit 1208 receives the result of the inquiry from the printing apparatus 103.

A sheet holding information 1210 is sheet information registered in a sheet holding unit included in the printing apparatus 103. The sheet holding information 1210 is information stored such that sheet holding units and pieces of sheet information are associated with each other. For example, when the top screen 401 illustrated in FIG. 6A is displayed on the display device 113, "plain paper 1" and "sheet holding unit 1" are stored, as the sheet holding information 1210, in association with each other.

According to an operation performed by the user using the keyboard 114 or the pointer device 115, a sheet holding information management unit 1209 updates the sheet holding information 1210. Further, when the sheet holding information 1210 is updated, sheet holding information 1306 in FIG. 5, which is stored in the printing apparatus 103, is synchronized via the data transmission/reception unit 1204.

Figure 5:
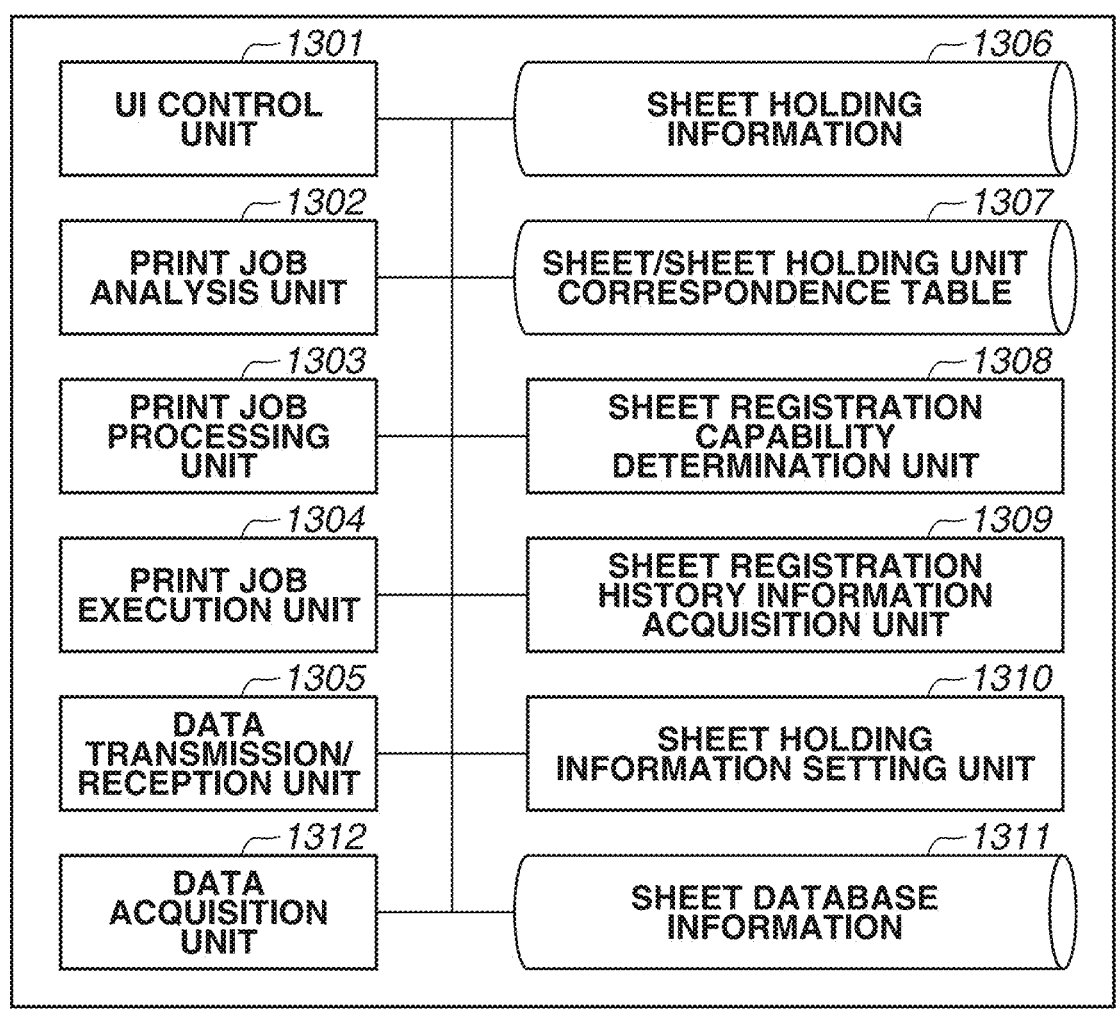
FIG. 5 is a block diagram illustrating a software configuration of the printing apparatus.

FIG. 5 is a block diagram illustrating the software configuration of the printing apparatus 103. These software modules are stored as programs in the storage device 211 and are loaded into the RAM 202 and executed by the CPU 201.

A UI control unit 1301 controls display on the operation unit 205 and input from the operation unit 205.

A print job analysis unit 1302 analyzes data of a print job received from the print control apparatus 102. A print job processing unit 1303 executes a printing process required in the printing apparatus 103 on the print job. A print job execution unit 1304 controls a series of printing operations such as sheet holding, sheet conveyance, printing, and sheet discharge on the print job.

The printing apparatus 103 includes a plurality of sheet holding units. Based on information of a sheet to be used, which is analyzed by the print job analysis unit 1302, and sheet holding information 1306, the print job execution unit 1304 identifies a sheet holding unit in which the sheet to be used is set. Then, the sheet is held in this tray. A data transmission/reception unit 1305 controls the transmission and reception of data to and from the print control apparatus 102.

Sheet holding information 1306 stores the relationships between sheet holding units included in the printing apparatus 103 and pieces of sheet information registered in the respective sheet holding units. The sheet holding information 1306 is synchronized with the sheet holding information setting unit 1210, which is set using the sheet management application, whereby information of the sheet holding information 1306 is updated.

A sheet/sheet holding unit correspondence table 1307 is a table illustrating the relationships between the sheet holding units and sheets that can be set in the sheet holding units.

If an inquiry is received from the print control apparatus 102, a sheet registration capability determination unit 1308 references the sheet/sheet holding unit correspondence table 1307 and determines whether a sheet about which the inquiry is received can be set in each sheet holding unit.

A sheet holding information setting unit 1310 performs the processes of storing sheet information registered in each sheet holding unit and acquiring sheet information registered in each sheet holding unit.

If the sheet holding information 1306 is updated in the printing apparatus 103, a sheet registration history information acquisition unit 1309 acquires information of the updated sheet holding information 1306 and transmits the information to the print control apparatus 102 via the data transmission/reception unit 1305.

Sheet database information 1311 is similar to the sheet database information 1214 of the print control apparatus 102, and therefore is not described here. This database is stored in the storage device 211.

A data acquisition unit 1312 acquires model information and hardware option information of the printing apparatus 103 from the ROM 203 or the storage device 211 of the printing apparatus 103. According to a request from the print control apparatus 102, the acquired information is transmitted to the print control apparatus 102 via the data transmission/reception unit 1305.

In FIGS. 4 and 5, the sheet holding information setting unit 1210 and the sheet holding information 1306, and the sheet database information 1214 and 1311 are stored in both the print control apparatus 102 and the printing apparatus 103. Alternatively, each of the sheet holding information setting unit or the sheet holding unit information and the sheet database information may be stored in either of the print control apparatus 102 and the printing apparatus 103.

With reference to FIGS. 6A and 6B, a description is given of the sheet management application of the print control apparatus 102 used in the present exemplary embodiment. FIGS. 6A and 6B each illustrate a top screen 401, which is displayed on the display device 113 when the sheet management application starts. The sheet management application operates by the user starting the sheet management application on the print control apparatus 102.

FIG. 6A illustrates a screen displaying sheet information of sheets set in sheet holding trays attached to the printing apparatus 103. FIG. 6B illustrates a screen displaying buttons allowing the setting of various adjustment items of the printing apparatus 103. According to an instruction from the CPU 301, the top screen 401 of the sheet management application is drawn in a video memory for the top screen 401, and image data drawn in the video memory is also output as a video signal to the display device 113, whereby the top screen 401 is displayed.

The top screen 401 is a top screen of the sheet management application. A display area 402 is an area of which the display contents can be changed using a device tab 403 and an adjustment tab 404. If the user presses the device tab 403, the screen in FIG. 6A, which displays the sheet information of the sheets set in the sheet holding trays of the printing apparatus 103, is displayed in the display area 402. If the user presses the adjustment tab 404, the screen in FIG. 6B, which displays the buttons allowing the setting of the various adjustment items, is displayed in the display area 402.

A connection state 405 represents the connection state of a hardware option of the printing apparatus 103 currently connected to the print control apparatus 102. When the sheet management application starts, the print control apparatus 102 acquires hardware option information of the printing apparatus 103 and displays a correct image according to the acquired option information.

In the present exemplary embodiment, FIG. 6A illustrates the state where a plurality of print-on-demand (POD) decks having a plurality of sheet holding trays are attached, and a finisher is attached.

In the sheet holding unit buttons 406 to 413, the sheet information of the sheets set in the sheet holding trays is displayed.

A sheet list display area 414 is an area where a sheet list based on the sheet information stored in the sheet list is displayed. In the columns, attribute information such as the size and the basis weight of a sheet is displayed. In the rows, the type of a sheet is displayed. To display attribute information other than the currently displayed attribute information of the displayed sheets, the user operates a slider bar 416. Further, to display sheets other than the currently displayed sheets, the user operates a slider bar 415. While the device tab 403 is selected, it is possible to simultaneously confirm both the sheet information of the sheets set in the sheet holding trays, and a list of the pieces of sheet information stored in the sheet list.

FIG. 6B illustrates a screen for, regarding the sheet information displayed in the sheet list display area 414, setting adjustment items with respect to each piece of sheet information. An adjustment item list 417 is a list where buttons for setting various adjustment items are provided. Adjustment items that can be adjusted by the printing apparatus 103 are displayed. The user operates a slider bar 418 and thereby can confirm the settings of adjustment items that are not currently displayed.

A secondary transfer voltage button 419 is a button for adjusting a secondary transfer voltage. The secondary transfer voltage is adjusted, whereby, in a case where color unevenness occurs due to a transfer failure, it is possible to remedy the transfer failure by adjusting the voltage ratio of a transfer roller.

An "adjustment of glossiness/black grade" button 420 is a button for adjusting a glossiness/a black grade. When plain paper or coated paper is used, it is possible to adjust the gloss of an output image by adjusting the temperature of a fixing device.

Using the top screen 401 of the sheet management application, the user registers sheet information in a sheet holding tray. The user selects the device tab 403. The user places a cursor of the pointer device 115 at sheet information of a sheet to be selected and presses a button of the pointer device 115. Sheet information that can be selected is the sheet information displayed in the sheet list or the sheet information currently registered in the sheet holding unit buttons 406 to 413.

While holding down the button of the mouse with the cursor placed at the sheet information to be selected, the user moves the cursor to the position where a sheet holding unit button for setting the sheet having the sheet information is displayed. After the cursor moves to the position of the sheet holding tray button in which the sheet information is to be registered, the user releases the button of the mouse. In this manner, when the user releases the button of the mouse, the user can register the selected sheet information in the sheet holding tray indicated by the cursor. After registering the sheet information in the sheet holding tray, the user sets the sheet having the sheet information in the sheet holding tray.

Figure 7:
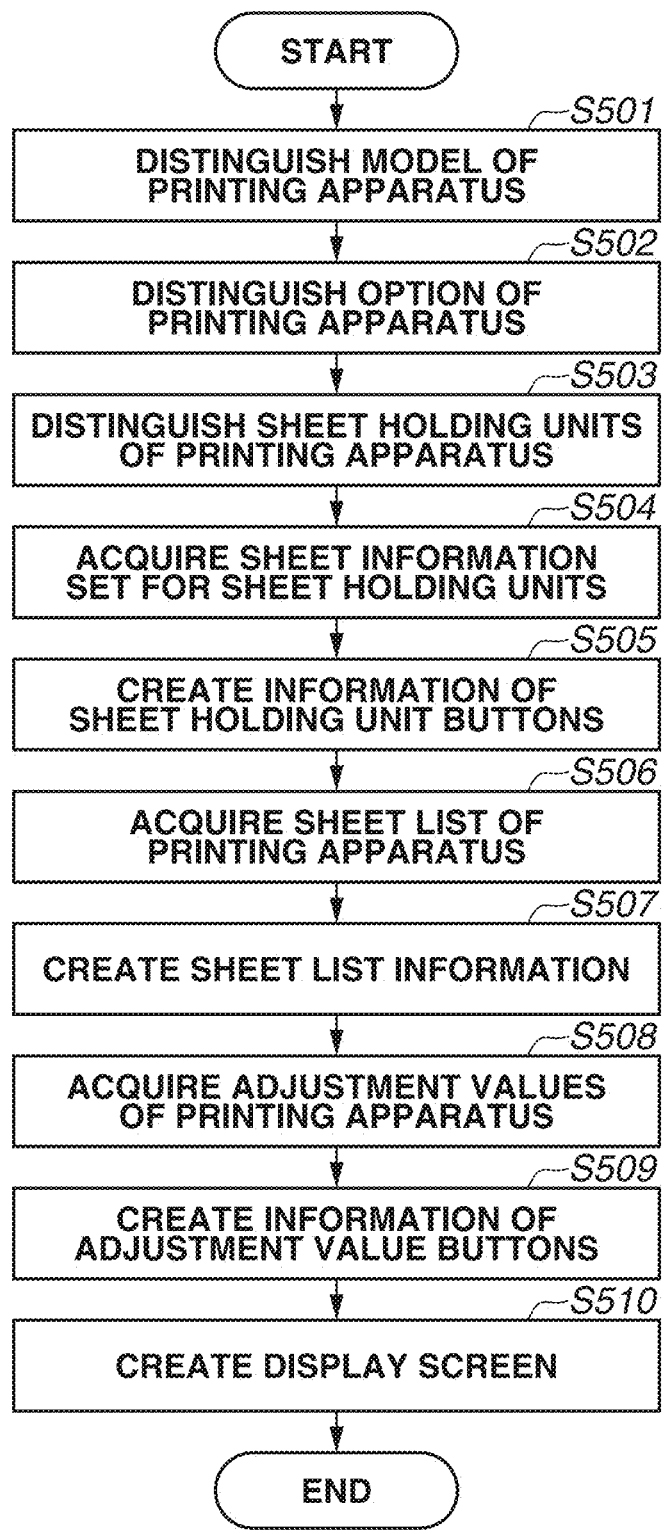
FIG. 7 is a flowchart when the sheet management application starts.

FIG. 7 illustrates processing performed when the print control apparatus 102 starts the sheet management application. A program for executing processing regarding a flowchart in FIG. 7 is stored in the storage device 309 in FIG. 3, loaded into the RAM 302, and executed by the CPU 301.

If the sheet management application starts, then in step S501, the CPU 301 distinguishes the model of the printing apparatus 103 as a sheet management target. Specifically, the CPU 301 communicates with the printing apparatus 103 and acquires model information. Then, based on model distinction information held in advance in the storage device 309, the CPU 301 distinguishes the model of the printing apparatus 103.

After step S501, then in step S502, the CPU 301 distinguishes hardware option information of a hardware option connected to the printing apparatus 103. Specifically, the CPU 301 communicates with the printing apparatus 103 and acquires the hardware option information. Then, based on hardware option information held in advance in the CPU 301, the CPU 301 distinguishes the acquired hardware option information.

After step S502, then in step S503, the CPU 301 distinguishes sheet holding units connected to the printing apparatus 103 as the sheet management target and identifies the number of sheet holding units connected to the printing apparatus 103.

After step S503, then in step S504, the CPU 301 communicates with the printing apparatus 103 and acquires sheet information set for each of the sheet holding units.

After step S504, then in step S505, the CPU 301 creates information of the sheet holding unit buttons 406 to 413 to be displayed on the screen 401.

After step S505, then in step S506, the CPU 301 communicates with the printing apparatus 103 and acquires sheet list information. The sheet list information is stored in the storage device 211 of the printing apparatus 103, and a sheet list stored in the printing apparatus 103 is synchronized with a sheet list stored in the print control apparatus 102.

After step S506, then in step S507, the CPU 301 creates a sheet list to be displayed in the sheet list display area 414. Even by a method other than the above method, the process of creating a sheet list to be displayed on the display device 113 of the print control apparatus 102 may be performed. For example, in step S505, the data transmission/reception unit 1204 may synchronize the sheet databases stored in the printing apparatus 103 and the print control apparatus 102. In step S506, based on the synchronized sheet databases, the sheet list creation unit 1211 may generate a sheet list.

After step S507, then in step S508, the CPU 301 communicates with the printing apparatus 103 and acquires the adjustment values of various adjustment items using adjustment buttons included in the adjustment item list 417.

After step S508, then in step S509, based on the acquired adjustment values, the UI control unit 1201 creates a character string to be displayed in each of the adjustment buttons included in the adjustment item list 417. If there is only one adjustment value, this adjustment value is displayed. If there are two or more values, "adjusted" or "not adjusted" is displayed.

In step S510, the UI control unit 1201 creates the top screen 401 of the CPU 301 using information in the following parentheses (the model information and the hardware option information of the printing apparatus 103 acquired in steps S501 and S502, the sheet holding unit button information created in step S505, the sheet list information created in step S507, and the adjustment button information created in step S509). Then, the created top screen 401 is displayed on the display device 113. Consequently, the screen illustrated in FIGS. 6A and 6B is generated.

Figure 8:
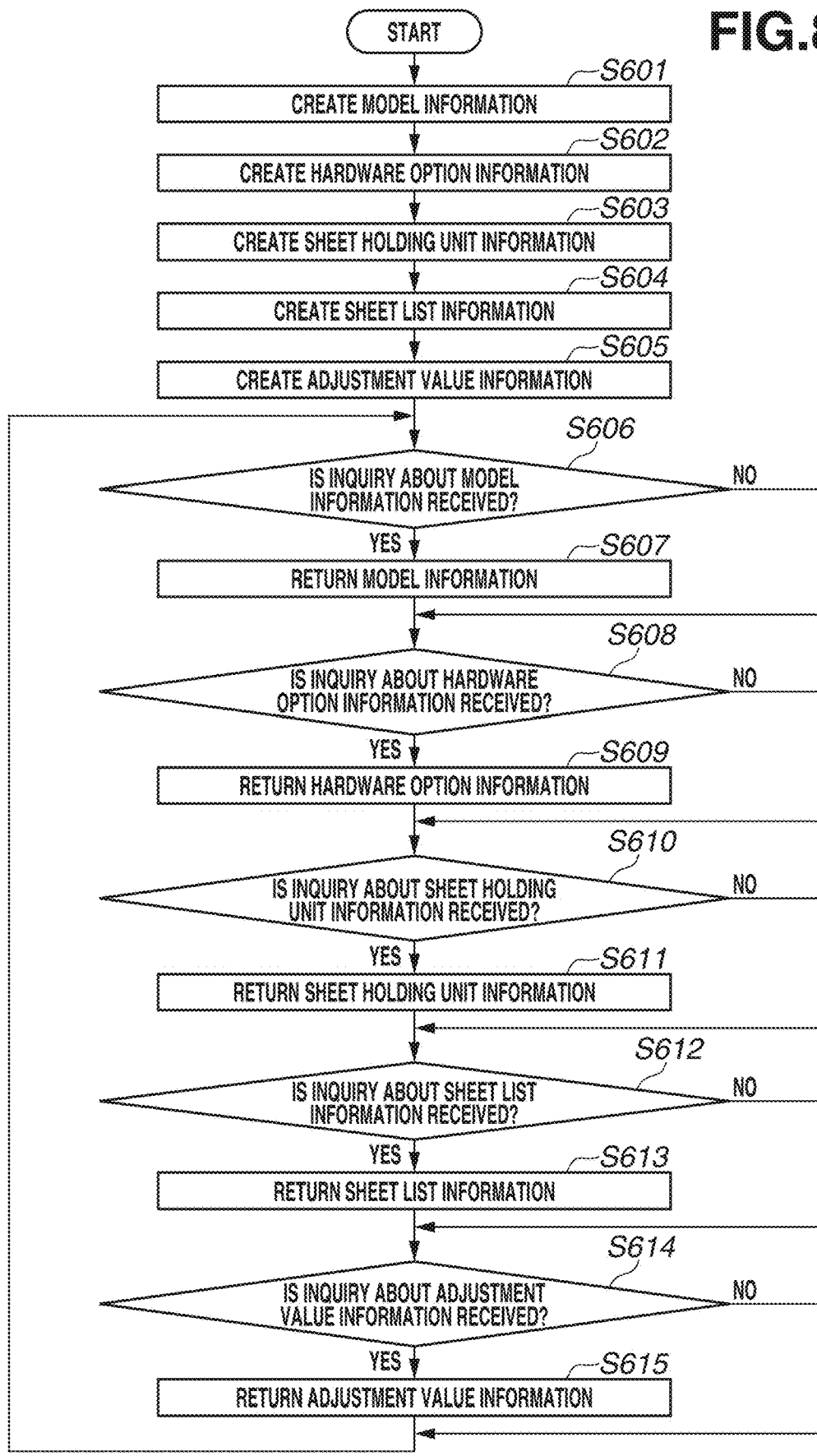
FIG. 8 is a flowchart when the printing apparatus starts.

With reference to a flowchart in FIG. 8, a description is given of the operation of the printing apparatus 103 when the print control apparatus 102 starts. A program for executing processing regarding the flowchart in FIG. 8 is stored in the storage device 211 in FIG. 2, loaded into the RAM 202, and executed by the CPU 201. The printing apparatus 103 is started, thereby starting the processing.

First, in step S601, the CPU 201 acquires model information of the printing apparatus 103 from the storage device 211 and creates the model information as data that can be returned.

After step S601, then in step S602, the printing apparatus 103 acquires hardware option information of a hardware option connected to the printing apparatus 103 from the storage device 211 and creates the hardware option information as data that can be returned.

After step S602, then in step S603, the CPU 201 creates data of sheet holding unit information from information regarding sheet holding unit information of the printing apparatus 103 and the hardware option information acquired in step S602.

After step S603, then in step S604, the CPU 201 acquires sheet list information of the printing apparatus 103 from the storage device 211 and creates the sheet list information as data that can be returned.

After step S604, then in step S5605, the CPU 201 acquires adjustment value information of the printing apparatus 103 from the storage device 211 and creates the adjustment value information as data that can be returned. As the adjustment values, the adjustment values of all adjustment items that can be implemented by CPU 201 are acquired.

After step S605, then in step S606, the CPU 201 determines whether an inquiry about the model information is received from the print control apparatus 102. If an inquiry about the model information is received (YES in step S606), the processing proceeds to step S607. If an inquiry about the model information is not received (NO in step S606), the processing proceeds to step S608.

If an inquiry about the model information is received, then in step S607, the CPU 201 transmits the model information created in step S601 to the print control apparatus 102.

After step S607 or if an inquiry about the model information is not received in step S606, then in step S608, the CPU 201 determines whether an inquiry about the hardware option information is received from the print control apparatus 102.

If an inquiry about the hardware option information is received in step S608 (YES in step S608), the processing proceeds to step S609. If an inquiry about the hardware option information is not received (NO in step S608), the processing proceeds to step S610.

If an inquiry about the hardware option information is received, then in step S609, the data transmission/reception unit 1305 transmits the hardware option information created in step S602 to the print control apparatus 102.

After step S609 or if an inquiry about the hardware option information is not received in step S608, then in step S610, the CPU 201 determines whether an inquiry about the sheet holding unit information is received from the print control apparatus 102.

If an inquiry about the sheet holding information is received in step S610 (YES in step S610), the processing proceeds to step S611. If an inquiry about the sheet holding information is not received (NO in step S610), the processing proceeds to step S612. At this time, if an inquiry about the sheet holding information is received, then in step S611, the CPU 201 transmits the sheet holding unit information created in step S603 to the print control apparatus 102, and the processing proceeds to step S612.

After step S611 or if an inquiry about the sheet holding information is not received in step S610, then in step S612, the CPU 201 determines whether an inquiry about the sheet list information is received from the print control apparatus 102.

If an inquiry about the sheet list information is received in step S612 (YES in step S612), the processing proceeds to step S613. If an inquiry about the sheet list information is not received (NO in step S612), the processing proceeds to step S614.

If an inquiry about the sheet list information is received, then in step S613, the CPU 201 transmits the sheet list information created in step S604 to the print control apparatus 102, and the processing proceeds to step S614.

After step S613 or if an inquiry about the sheet list information is not received in step S612, then in step S614, the CPU 201 determines whether an inquiry about the adjustment value information is received from the print control apparatus 102.

In step S614, if an inquiry about the adjustment value information is received (YES in step S614), the processing proceeds to step S615. If an inquiry about the adjustment value information is not received (NO in step S614), the processing returns to step S606.

If an inquiry about the adjustment value information is received, then in step S615, the CPU 201 transmits the adjustment value information created in step S605 to the print control apparatus 102.

After step S615 or if an inquiry about the adjustment value information is not received in step S614, the processing returns to step S606.

Figure 9:
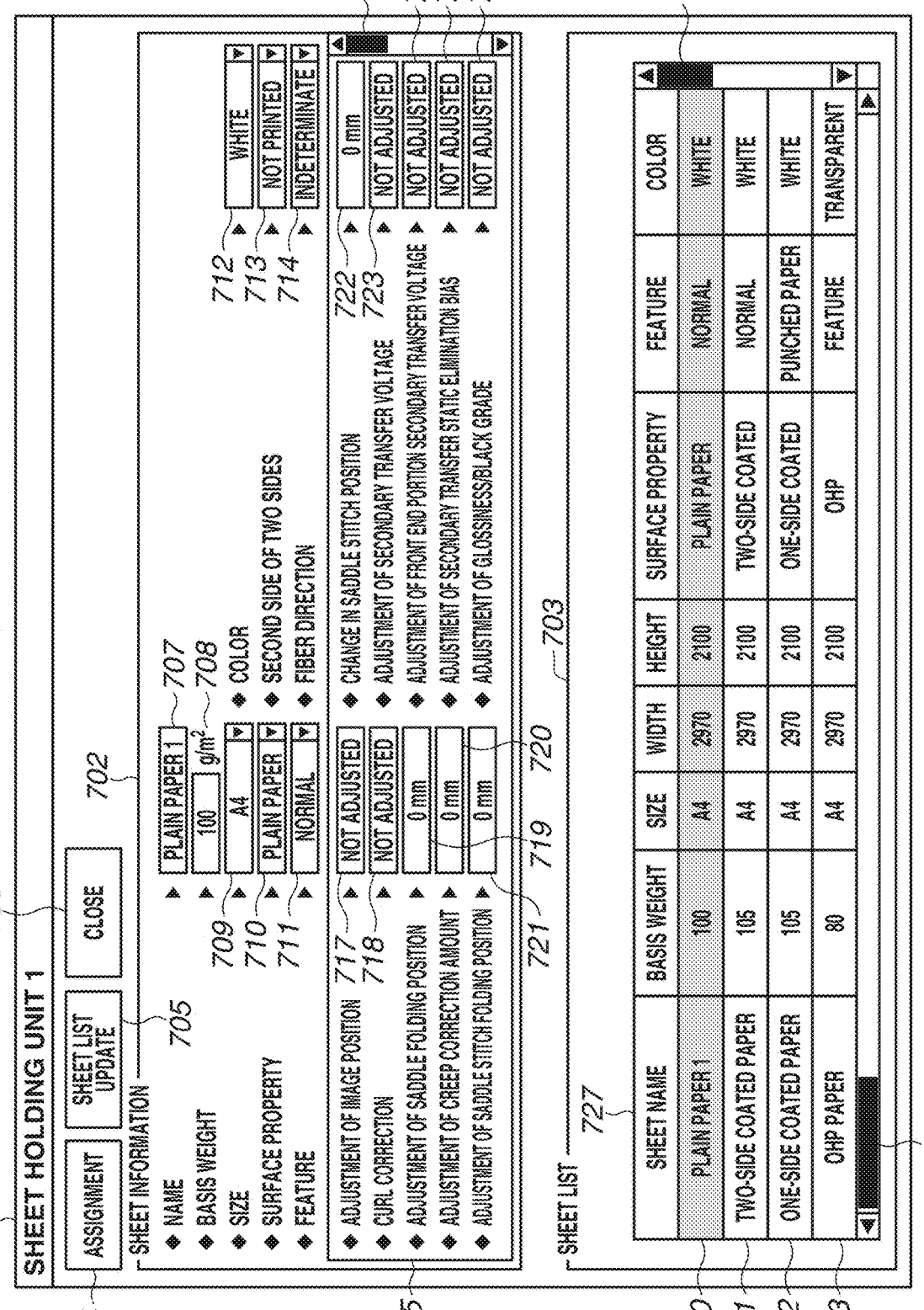
FIG. 9 is a diagram illustrating a screen of the sheet management application.

FIG. 9 is a sheet setting screen for a sheet holding unit 1. According to an instruction from the CPU 301, the sheet setting screen for the sheet holding unit 1 is drawn in a video memory for the sheet setting screen, and image data drawn in the video memory is also output as a video signal to the display device 113, whereby the sheet setting screen is displayed.

A screen 701 is an initial screen of the sheet setting screen for the sheet holding unit 1. On the screen 701, a display area 702, a display area 703, an assignment button 704, an update button 705, and a "close" button 706 are displayed.

In the display area 702, setting information of a currently selected sheet is displayed. When the sheet holding unit button 406 is pressed, and the screen 701 opens, information of a sheet currently assigned to the sheet holding unit 1 is displayed.

In the display area 703, sheet information managed by the printing apparatus 103 is displayed upon receipt of the sheet information by the print control apparatus 102. In the display area 703, as the sheet information, attribute values (the basis weight, the size, and the width) of a sheet and the settings of adjustment items (not illustrated) (the adjustment of an image position, curl correction, and the adjustment of a glossiness/a black grade) corresponding to the type of the sheet are listed.

If a sheet is selected from the sheet list displayed in the display area 703, information of the selected sheet is displayed in the display area 702.

First, input items in the display area 702 are described. A text field 707 is an area where the name of a sheet can be input. To change the name described in the text field 707, characters can be input to the text area using the keyboard 114. In the following descriptions, a description such as "the keyboard 114 is used when an input is provided" will be omitted.

The update button 705 is pressed, whereby the sheet information displayed on the print control apparatus 102 is updated to sheet information reflecting a received change. Further, the print control apparatus 102 transmits the sheet information reflecting the received change to the printing apparatus 103. Then, the printing apparatus 103 stores the received sheet information.

A text field 708 is an area where the basis weight can be input. The operation of the text field 708 is similar to that of the text field 707, and therefore is not described here.

A combo box 709 is an area where size information of the sheet is displayed. A desired size can be selected from size information displayed in a list and can be set. A combo box 710 is an area where surface property information is displayed. A combo box 711 is an area where feature information is displayed. A combo box 712 is an area where color information is displayed. A combo box 713 is an area where information about the second side of a two-sided copy is displayed. A combo box 714 is an area where fiber direction information is displayed. The operations of the combo boxes 710, 711, 712, 713, and 714 are similar to that of the combo box 709, and therefore are not described here.

A setting area 715 is an area where the settings of various adjustment items are displayed together. In this case, some adjustment items are illustrated as examples. To confirm the setting of an adjustment item that is not currently displayed when there are many adjustment items in the setting area 715 as in FIG. 9, the user operates a slider bar 716 and thereby can display the setting value of the adjustment item.

A setting item button 717 is a button for setting the adjustment of an image position and indicates whether the current sheet is already adjusted. If the current sheet is already adjusted, the setting item button 717 indicates "adjusted". If the current sheet is not adjusted, the setting item button 717 indicates "not adjusted". The setting item button 717 is pressed, whereby an adjustment screen opens. Then, various adjustment values can be input on the adjustment screen.

A setting item button 718 is a button for setting curl correction. A setting item button 719 is a button for adjusting a saddle folding position. In the setting item button 719, the current adjustment value is displayed, for example, in millimeters.

A setting item button 720 is a button for adjusting a creep correction amount. A setting item button 721 is a button for adjusting a saddle stitch folding position. A setting item button 722 is a button for adjusting a saddle stitch position. A setting item button 723 is a button for adjusting a secondary transfer voltage. A setting item button 724 is a button for adjusting a front end portion secondary transfer voltage.

A setting item button 725 is a button for adjusting a secondary transfer static elimination bias. A setting item button 726 is a button for adjusting a glossiness/a black grade. The operations of the setting item buttons 718 to 726 are similar to that of the setting item button 717, and therefore are not described here.

Next, a display area 703 is described. A table 727 is a table displaying a sheet list. In the columns, sheet information of a sheet is set. In the rows, the type of a sheet is set. In each row, pieces of sheet information of each sheet are set. To display sheet information of sheets other than that of the currently displayed sheets, the user operates slider bars 728 and 729 and thereby can display the sheet information.

A row 730 indicates sheet information of plain paper 1. In FIG. 9, the row 730 is, for example, displayed in a highlighted manner so that it is understood that plain paper 1 is currently selected by the user.

Rows 731 to 733 indicate sheet information of sheets that are not currently displayed in the display area 702. If any of the rows 731 to 733, which are not currently selected, is selected from the table 727 in the display area 703, information of the selected sheet is then displayed in the display area 702. In this state, the user presses the assignment button 704 and thereby can assign the newly selected sheet to the sheet holding unit 1. To end the operation without changing anything, the user presses the "close" button 706.

Figure 10:
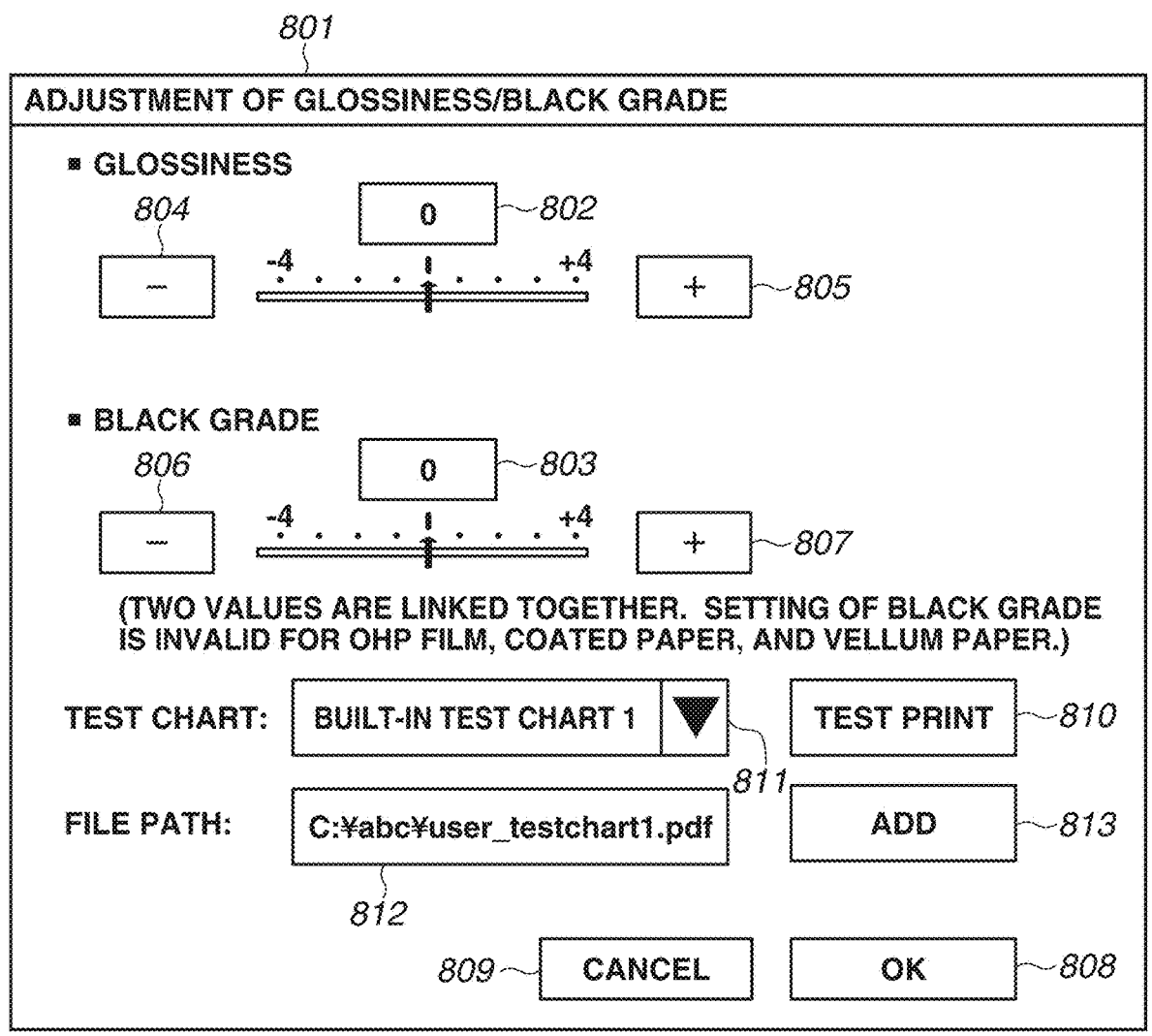
FIG. 10 is a diagram illustrating an adjustment screen for test information.

Next, with reference to FIG. 10, the adjustment of test information is described. FIG. 10 illustrates, as an example of an adjustment screen for test information, an adjustment screen for sheet information when the setting item button 726 for the glossiness/the black grade in FIG. 9 is pressed. In this case, a sheet, a test chart, and the setting of an adjustment item are collectively referred to as "test information". "Collectively" refers to the state where these pieces of information can be read in association with each other.

First, an adjustment screen 801 is an adjustment screen for the glossiness/the black grade. If the user selects a predetermined sheet from the sheet list display area 414 and presses the setting item button 726 for the glossiness/the black grade, the adjustment screen 801 in FIG. 10 opens. At this time, according to an instruction from the CPU 301, the adjustment screen 801 is drawn in a video memory for the adjustment screen 801, and image data drawn in the video memory is also output as a video signal to the display device 113, whereby the adjustment screen 801 is displayed.

The adjustment screen 801 is a screen allowing the setting of the glossiness/the black grade. A text box 802 is used to set the glossiness. A text box 803 is used to set the black grade. The adjustment values of the settings of the glossiness and the black grade are linked together. Thus, if one of the adjustment values is changed, the other is automatically changed to a corresponding value. If the black grade is set, the adjustment value of the black grade is invalid for an overhead projector (OHP) film, coated paper, and vellum paper. Thus, when this setting is made, an OHP film, coated paper, and vellum paper are sheets that cannot be adjusted.

The user can directly input the adjustment values to the text boxes 802 and 803. Alternatively, the user can also input the adjustment values by pressing "−" buttons 804 and 806 and "+" buttons 805 and 807. The user inputs the adjustment values to the text boxes 802 and 803 and presses an "OK" button 808 or a "test print" button 810, and thereby can change the settings of the glossiness/the black grade.

When the "OK" button 808 is pressed, the print control apparatus 102 saves the settings of the glossiness/the black grade after the adjustment values are input.

When a "cancel" button 809 is pressed, the print control apparatus 102 does not store the values input to the text boxes 802 and 803 as the settings of the glossiness/the black grade.

When the "test print" button 810 is pressed, the print control apparatus 102 instructs the printing apparatus 103 to execute test printing for confirming the finish of a print product printed based on the settings of the glossiness/the black grade after the adjustment values are input.

In the test printing, the printing apparatus 103 receives image data termed a test chart from the user and performs printing using the received test chart (test chart reception). As test charts, there are a built-in test chart and a user-specified test chart. In the present exemplary embodiment, a test chart saved in advance in the printing apparatus 103 is referred to as a "built-in test chart". Then, in the present exemplary embodiment, a test chart registered in the printing apparatus 103 by the user specifying image data through the print control apparatus 102 is referred to as a "user-specified test chart".

A test chart selection box 811 is a box allowing the selection of a predetermined test chart from among test charts registered in a test chart list when test printing is performed. The test chart selection box 811 is displayed based on a test chart list saved in the print control apparatus 102.

To add a new user-specified test chart, the user inputs the path for image data to be added or the image data to a file input area 812 using the keyboard 114 and presses an "add" button 813. Consequently, the added user-specified test chart is stored in the test chart list in the print control apparatus 102 (test chart addition). Then, in the test chart selection box 811, the user can select the user-specified test chart added to the test chart list.

In a case where image data is input to the file input area 812, the input image data is copied to and saved in a directory managed by the sheet management application.

FIG. 11 illustrates an example of the test chart list saved in the print control apparatus 102. In a test chart list 1701, past test information is saved. The past test information is, for example, a sheet, a test chart, and the setting of an adjustment item stored in advance in the print control apparatus 102 by setting the adjustment item without performing printing in the past, or by performing printing in the past.

FIG. 11 illustrates a configuration in which past test information in a case where a user-specified test chart is selected is stored. Alternatively, past test information in a case where a built-in test chart is selected may be stored. Yet alternatively, test information of both a user-specified test chart and a built-in test chart may be stored in a test chart list.

Further, in this case, a test chart list regarding the adjustment item for the glossiness/the black grade is illustrated. Alternatively, there may be a test chart list for each adjustment item.

In the test chart list 1701, "sheet name" 1702 indicates the type of a selected sheet. "File name" 1703 indicates the file name of image data output as a test chart or the path to the save location for the image data. "Setting value of adjustment item" 1704 is the setting value of the adjustment item used when a chart is printed. In the test chart list 1701 illustrated in FIG. 11, the adjustment values of the settings of the glossiness/the black grade are illustrated.

In a row 1705, pieces of information indicating plain paper 1 as a selected sheet, "C:\abc\user_testchart1.pdf" as the path for image data, and the adjustment value as the setting value are collectively saved. In a row 1706, pieces of information indicating plain paper 1 as a selected sheet, "C:\abc\user_testchart1.pdf" as the path for image data, and the adjustment value "1" as the setting value are collectively saved.

That is, in the rows 1705 and 1706, test information is saved, which indicates the same sheet and the path for the same image data, but in which different adjustment values are set.

As described above, in the test chart list 1701 in FIG. 11, test information saved in the past is saved.

Next, with reference to FIG. 12, a description is given of the selection of a sheet holding unit with which test printing is to be performed. FIG. 12 illustrates, as an example of a selection screen for a sheet holding unit with which test printing is to be performed, a selection screen displayed when the "test print" button 810 in FIG. 10 is pressed.

According to an instruction from the CPU 301, a selection screen 901 illustrated in FIG. 12 is drawn in a video memory for the selection screen 901, and image data drawn in the video memory is also output as a video signal to the display device 113, whereby the selection screen 901 is displayed.

The selection screen 901 is a screen on which an image diagram 902 of the printing apparatus 103 and buttons indicating a plurality of sheet holding units 903 to 910 are placed. Further, the image diagram 902 of the printing apparatus 103 represents a hardware option connected to the printing apparatus 103.

The user selects a sheet holding unit with which test printing is to be performed. Then, the user can perform the test printing using a sheet held in the selected sheet holding unit. For example, if the user presses the sheet holding unit button 903, the print control apparatus 102 transmits test information including the adjustment values of the glossiness/the black grade in the text boxes 802 and 803 in FIG. 10 to the printing apparatus 103. The printing apparatus 103 performs test printing based on the received test information.

FIG. 13 is a list indicating whether, in a case where test printing is performed using different test charts, the test printing results of each adjustment item differ. A setting item of which, when printing is performed using different images, the printing results differ is a setting item that should be adjusted for each image to be printed.

An adjustment item list 1101 indicates, with respect to each type of sheet, whether the test printing result of each adjustment item differs depending on the test chart. In the adjustment item list 1101, a column 1102, which indicates an adjustment item name, and a column 1103, which indicates the presence or absence of a difference in test printing result, are provided.

After the adjustment items are adjusted, test printing is performed with respect to each adjustment item. At this time, the test printing may be performed using a built-in test chart as a test chart. Alternatively, image data specified by the user may be used. In this case, it is possible to adjust each adjustment item using data to be actually printed.

Among the adjustment items, for example, the item for the adjustment of the image position is adjusted, whereby, when image data is printed on a sheet, it is possible to adjust the position of the image relative to the sheet.

For example, in the case of the item for the adjustment of the image position, the printing results differ between a case where a user-specified test chart is printed and a case where a built-in test chart is printed. This is because the positions of images of the respective test charts are different from each other. That is, in a case where test printing is performed using a built-in test chart, and an actual print product is printed, the resulting product may be different from a print product desired by the user. On the other hand, image data to be used for an actual print product is used as a user-specified test chart, whereby it is possible to confirm the effect of the setting of the adjustment of the image position in a case where the actual print product is printed. In FIG. 13, if such an effect can be confirmed in an adjustment item, the adjustment item is indicated by "o".

Meanwhile, regarding the curl correction amount, the amount of curl of a sheet varies depending on the differences in the temperature characteristics or the moisture characteristics of the sheet due to the difference in conveying path. Thus, the curl correction amount does not differ depending on the type of the image to be printed. That is, the printing results are the same in a case where a user-specified test chart is used and a case where a built-in test chart is used.

Thus, in such an adjustment function, when the effect of the setting of the adjustment item is confirmed, the printing results are the same when a built-in test chart is used and when a user-specified test chart is used. Thus, the adjustment item is indicated by "x".

In the present exemplary embodiment, the adjustment item list 1101 may not be created for an adjustment function in which the same adjustment effect can be seen whichever of a built-in test chart and a user-specified test chart is used.

The test printing result of the adjustment item for the glossiness/the black grade, which is used as an example in the present exemplary embodiment, varies depending on the test chart, and therefore, the adjustment item is indicated by "o".

Figure 14:
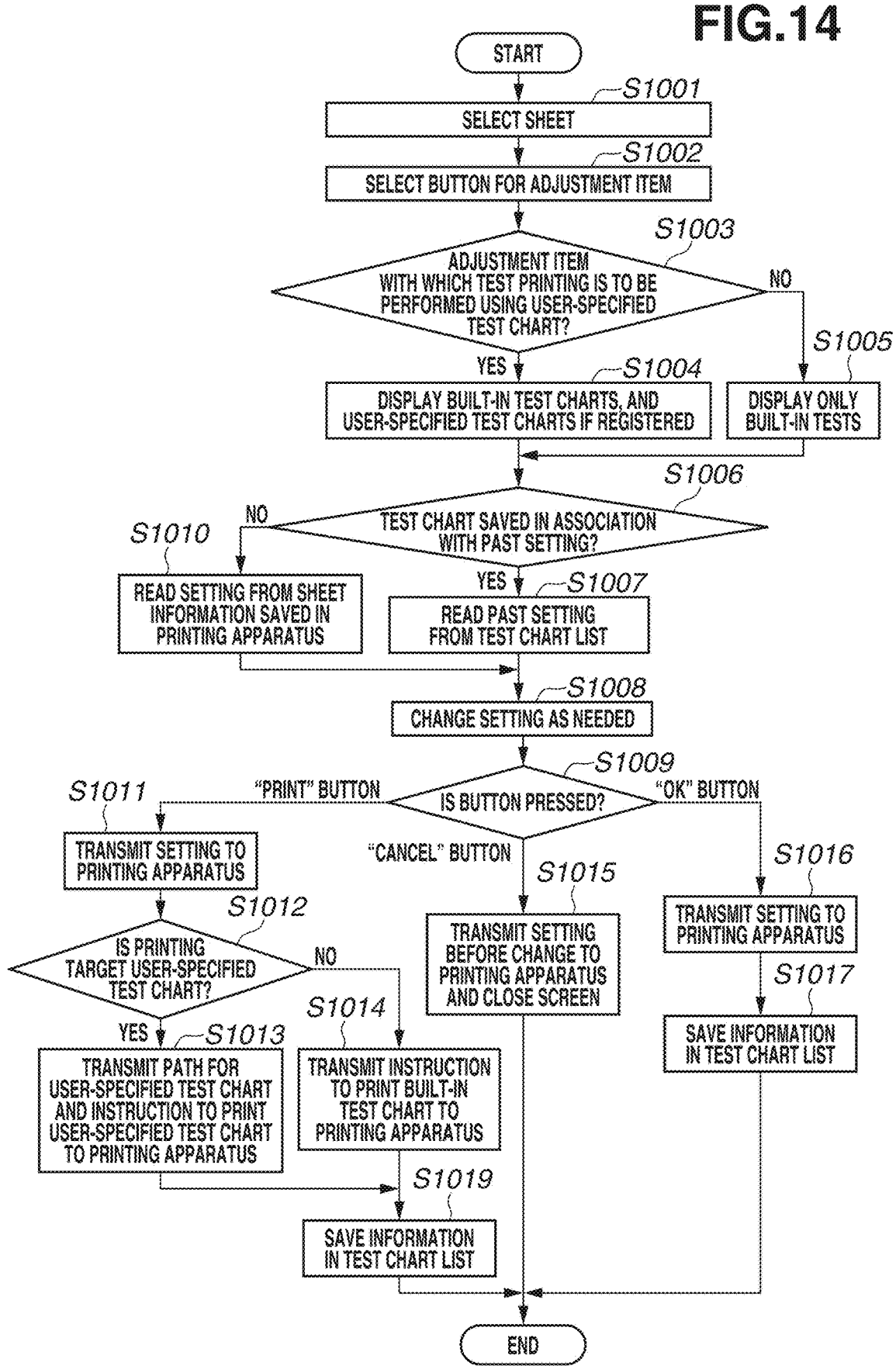
FIG. 14 is a processing flowchart for test printing regarding the print control apparatus.

With reference to FIG. 14, a flowchart for test printing regarding the print control apparatus 102 is described. A program for the print control apparatus 102 according to the flowchart in the present exemplary embodiment is stored in the storage device 309 in FIG. 3, loaded into the RAM 302, and executed by the CPU 301. In the present exemplary embodiment, the description is given using the adjustment of the glossiness/the black grade as an example. The same, however, applies to processing for other adjustment parameters. Further, in the present exemplary embodiment, a case is described where a button for the sheet holding unit 1 in FIG. 6A is pressed. The same, however, applies to a case where a button for another sheet holding unit is pressed.

In step S1001, the CPU 301 selects a sheet associated with a sheet feeding unit indicated by the user. Then, the CPU 301 displays on the display the sheet setting screen for the sheet holding unit 1 illustrated in FIG. 9. In this case, an example is illustrated where a sheet named "plain paper 1" is set for the sheet holding unit 1, and the user performs an adjustment operation regarding this sheet.

In step S1002, the CPU 301 selects the setting item button 726 for the glossiness/the black grade, which is indicated by the user, among the adjustment items of the sheet set for the sheet holding unit 1 selected in step S1001. If the user presses an "adjustment of glossiness/black grade" button, the CPU 301 displays the adjustment screen 801 for the glossiness/the black grade in FIG. 10, and the processing proceeds to step S1003.

In step S1003, using the adjustment item list 1101 illustrated in FIG. 13, the CPU 301 determines whether the adjustment item is an adjustment item of which the test printing results differ between a user-specified test chart and a built-in test chart. To adjust an adjustment item of which the test printing results differ between a user-specified test chart and a built-in test chart, it is desirable to set the adjustment value using image data to be used for actual printing. If the CPU 301 determines in step S1003 that the adjustment item is an adjustment item of which the test printing results differ between a user-specified test chart and a built-in test chart (YES in step S1003), the processing proceeds to step S1004.

In step S1004, the CPU 301 displays built-in test charts and user-specified test charts in a selectable manner. FIG. 15 illustrates an example of a setting screen for test information displayed at this time.

In FIG. 15, an adjustment screen 1801 is the same screen as the adjustment screen 801 for the glossiness/the black grade, which is described with reference to FIG. 10. The adjustment screen 1801 illustrates the state where built-in test charts and user-specified test charts are displayed in a selectable manner. Specifically, if the user selects a triangle button in a list box 1802, built-in test charts and user-specified test charts that can be used as a test chart at this time are displayed. If no user-specified test chart is registered, only built-in test charts are displayed.

Then, based on an instruction from the user, the CPU 301 selects a test chart to be used for test printing from among the test charts displayed in the list box 1802. If the selection is completed, the processing proceeds to step S1006.

If, on the other hand, the CPU 301 determines in step S1003 that the adjustment item is an adjustment item of which the test printing results do not differ between a user-specified test chart and a built-in test chart (NO in step S1003), the processing proceeds to step S1005. In step S1005, the CPU 301 displays only built-in test charts in a selectable manner in the list box 1802 in FIG. 15. Then, if the user selects a predetermined test chart, the processing proceeds to step S1006.

In step S1006, using the test chart list 1701 in FIG. 11, the CPU 301 determines whether the test chart selected in step S1004 or S1005 is a test chart saved in association with a past setting value.

If the selected test chart is a test chart of which test information (information) is saved in association with the setting of a past adjustment value in step S1006 (YES in step S1006), the processing proceeds to step S1007. A test chart of which test information is saved in association with a past adjustment value is, for example, a test chart of which test information (information) is saved when a desired print product has been printed in the past and which is illustrated in FIG. 11.

In step S1007, based on the saved test information, the CPU 301 reads the past adjustment value from the test chart list 1701 in FIG. 11. Then, the CPU 301 sets the read setting value as the setting value of the adjustment item. Specifically, the CPU 301 sets read adjustment values in the text boxes 802 and 803 in FIG. 10.

When applying the read setting value, the CPU 301 may display a screen for confirming with the user whether to use the read setting value. Then, only if the user chooses to use the read setting value, the CPU 301 may apply the read setting value. If the processing in step S1007 is completed, the processing proceeds to step S1008.

If, on the other hand, the CPU 301 determines in step S1006 that the selected test chart is a test chart of which test information is not saved in association with a past adjustment value (NO in step S1006), the processing proceeds to step S1010. A test chart of which test information is not saved in association with a past adjustment value is, for example, a newly registered user-specified test chart or a built-in test chart of which test information is not saved.

In step S1010, the CPU 301 reads the setting values of the adjustment item from the sheet information of the glossiness/the black grade of the plain paper 1 held in the printing apparatus 103 and illustrated in the display area 703 in FIG. 9. The CPU 301 sets the read setting values of the adjustment item in the text boxes 802 and 803 in FIG. 10. If step S1010 is completed, the processing proceeds to step S1008.

In step S1008, the user changes the setting value as needed. To change the setting value, the user changes the adjustment values set in the text boxes 802 and 803.

Specifically, the past setting value is read in step S1007, and based on the adjustment values set in the text boxes 802 and 803, the user changes the setting value. Consequently, for example, in a case where the user wishes to read the same test chart and the same setting of an adjustment item for the same sheet and set the adjustment item in the middle on another occasion, it is possible to make the setting simpler than setting the adjustment item from the beginning.

The setting value does not necessarily need to be changed in step S1008. This corresponds to a case where printing is performed using an adjustment value obtained by reading the past setting value in step S1007. This corresponds to, for example, a case where printing is performed again using a setting used when printing has been performed once. If the processing in step S1008 is completed, the processing proceeds to step S1009.

In step S1009, the CPU 301 determines whether the "test print" button 810 in FIG. 10 is pressed. If the "test print" button 810 is pressed ("print" button in step S1009), the processing proceeds to step S1011. If the user presses the "OK" button 808 in FIG. 10 ("OK" button in step S1009), the processing proceeds to step S1016. If the user presses the "cancel" button 809 ("cancel" button in step S1009), the processing proceeds to step S1015.

In step S1011, the CPU 301 transmits to the printing apparatus 103 the settings of the adjustment values of the glossiness/the black grade input on the adjustment screen 1801 in FIG. 15. Then, the processing proceeds to step S1012.

If the CPU 301 determines that the test chart as a target of the test printing is a user-specified test chart in step S1012 (YES in step S1012), the processing proceeds to step S1013.

In step S1013, the CPU 301 transmits the user-specified test chart to the printing apparatus 103 using the Line Printer Remote (LPR) protocol. Further, the CPU 301 transmits a print instruction to print the user-specified test chart to the printing apparatus 103. Then, the processing proceeds to step S1019.

If, on the other hand, the test chart as a target of the test printing is a built-in test chart in step S1012 (NO in step S1012), the processing proceeds to step S1014.

In step S1014, when printing the built-in test chart, the CPU 301 specifies the number of the built-in test chart and gives a print instruction to print the built-in test chart.

Consequently, based on the settings of the glossiness/the black grade received in step S1011, the printing apparatus 103 prints the built-in test chart. If the processing in step S1014 is completed, the processing proceeds to step S1019.

Then, in step S1019, the CPU 301 saves the test information (the sheet, the test chart, and the setting of the setting item) used for the test printing in the test chart list 1701 in FIG. 11 in the RAM 302. If the processing in step S1019 is completed, the processing flow for test printing ends.

Next, a case is described where the user presses the "cancel" button 809 in step S1009. If the "cancel" button 809 is pressed in step S1009, the processing proceeds to step S1015. In step S1015, the CPU 301 changes the setting back to that before the change, and ends the adjustment screen for the glossiness/the black grade. If the test printing is canceled in step S1015, the processing flow for test printing ends.

Next, if the "OK" button 808 in FIG. 10 is pressed in step S1009, the processing proceeds to step S1016.

In step S1016, the CPU 301 transmits to the printing apparatus 103 the settings of the adjustment values input to the text boxes 802 and 803, which are displayed on the adjustment screen for the glossiness/the black grade. Then, the printing apparatus 103 saves sheet information in the sheet list such that the received settings are the settings of the glossiness/the black grade of the plain paper 1. The processing proceeds to step S1017.

In step S1017, the CPU 301 saves the path for the test chart and the setting value specified by the user, in association with a sheet name in the test chart list 1701. If step S1017 is completed, the processing flow for test printing ends.

In step S1017, when the CPU 301 saves the test information regarding the test chart for the glossiness/the black grade illustrated in FIG. 11, and if there is no test information indicating the same sheet name and file, the CPU 301 newly adds test information. If there is test information indicating the same sheet name and file name, the CPU 301 may overwrite the saved test information with a new adjustment value or may newly save test information.

Further, a user interface for deleting a test chart and information of the test chart registered in a test chart list may be provided, and an unnecessary test chart or unnecessary information may be deleted from the test chart list. Further, if printing is not actually performed, the setting value may be set to blank and saved in the test chart list regarding the glossiness/the black grade. In this case, in step S1006 for the next test printing, if the user selects a test chart of which the setting value is blank, the selected test chart is treated as a newly input test file.

According to the present exemplary embodiment, after test information is stored and in a case where printing is performed using the same test information on another occasion or a case where a user wishes to read the same test information and set an adjustment item in the middle on another occasion, it is possible to save the trouble of adjusting the adjustment item.

Figure 17:
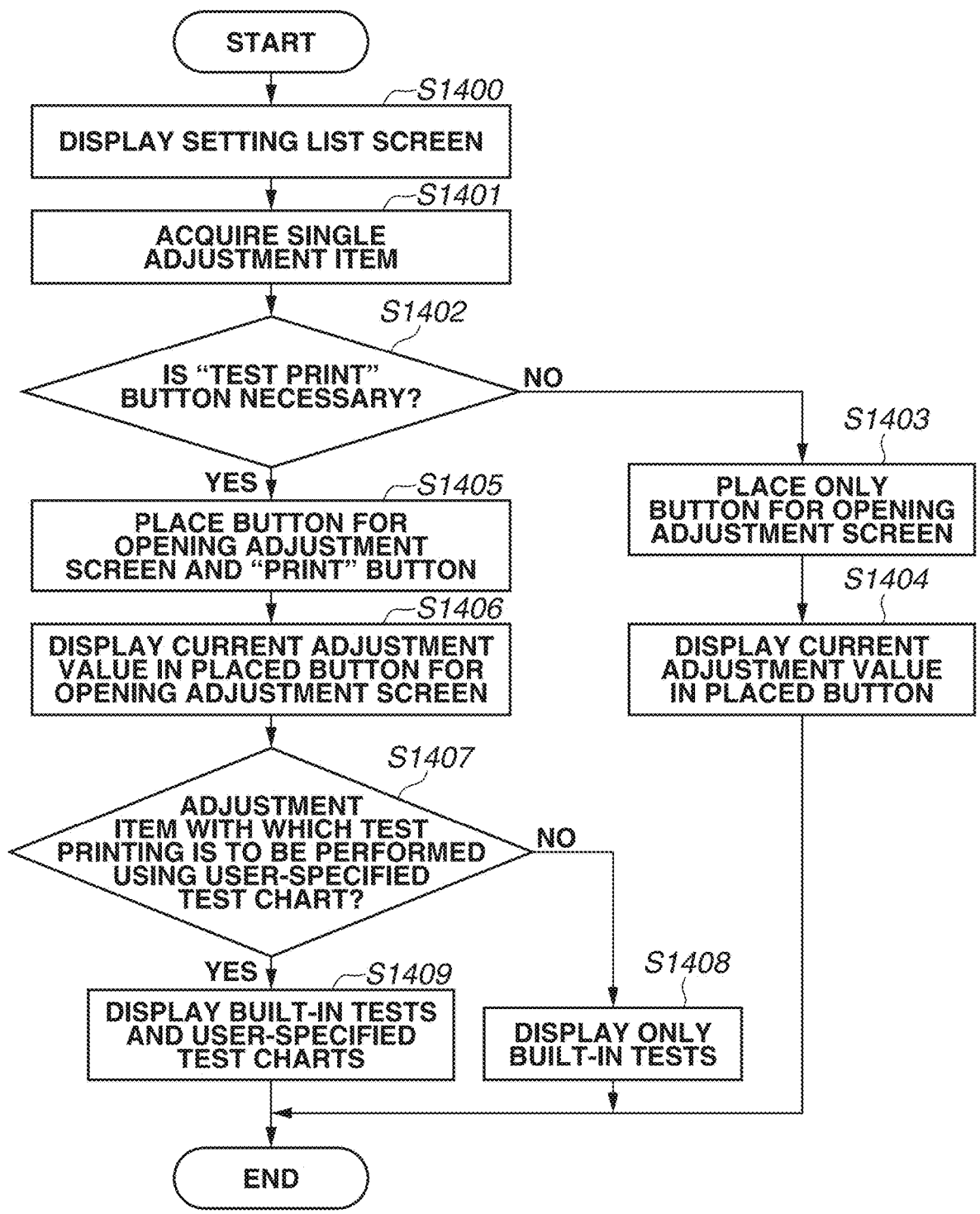
FIG. 17 is a processing flowchart for determining whether test printing is to be performed with an adjustment value.

A second exemplary embodiment is described below. With reference to FIGS. 16 to 18, a print control apparatus according to the present exemplary embodiment is described. Portions having functions similar to those in FIGS. 1 to 15 are designated by the same numerals, and are not described in detail here.

With reference to FIG. 16, an adjustment screen for test information is described. FIG. 16 illustrates an example of the adjustment screen for test information. The screen in FIG. 16 is different from that in FIG. 9 in that a plurality of text boxes indicating the adjustment states of adjustment items, a plurality of combo boxes for receiving the selection of test charts in the adjustment items, and a plurality of "test print" buttons are displayed on a single screen 1501.

Next, with reference to FIG. 17, a description is given of a flowchart for displaying the adjustment screen for test printing in FIG. 16.

If the user presses the adjustment tab 404 in FIG. 6A, the processing proceeds to step S1400. In step S1400, the CPU 301 displays a plurality of adjustment items in a list, and the processing proceeds to step S1401.

In step S1401, the CPU 301 selects a single adjustment item selected by the user from the adjustment items displayed on an adjustment setting list screen, and the processing proceeds to step S1402.

In step S1402, the CPU 301 determines whether the adjustment item selected in step S1401 is an adjustment item for which a "test print" button is to be displayed. If it is determined that the adjustment item selected in step S1401 is not an adjustment item for which a "test print" button is to be displayed (NO in step S1402), the processing proceeds to step S1403.

The case where a "test print" button is not to be displayed is, for example, a case where a saddle stitching device is broken, or consumables for use in saddle stitching run out. In a case where the saddle stitching device is broken, or in a case where consumables for use in saddle stitching run out, the saddle stitch position cannot be changed, and the saddle stitch folding position cannot be adjusted. In response, a "test print" button is not displayed so as to prevent the user from giving an instruction to execute test printing for adjusting an adjustment item that cannot be implemented. In a case where a "test print" button is not necessary, a button for this adjustment value may be hidden. Further, the CPU 301 may display somewhere on the screen 1501 the reason why the "test print" button is not displayed.

In step S1403, the CPU 301 places on the screen 1501 an adjustment button for the adjustment item for which the "test print" button is not to be displayed. This adjustment button is, for example, an adjustment button 1502 for adjusting the saddle stitch folding position. Alternatively, the processing in step S1403 may be omitted.

In step S1404, the CPU 301 displays the current adjustment value in the placed adjustment button. Further, if there is no adjustment value, the CPU 301 leaves the adjustment button blank.

If it is determined in step S1402 that the adjustment item selected in step S1401 is an adjustment item for which a "test print" button needs to be displayed (YES in step S1402), the processing proceeds to step S1405.

In step S1405, the CPU 301 displays a "test print" button and an adjustment button corresponding to the adjustment item. These buttons are, for example, adjustment buttons 1503, 1504, and 1505 and "test print" buttons 1511, 1512, 1513, 1514, and 1515. If the processing in step S1405 is completed, the processing proceeds to step S1406.

Steps S1407, S1408, and S1409 are similar to steps S1003, S1004, and S1005 in FIG. 14.

If the processes in steps S1404, S1408, and S1409 are completed, the flowchart for displaying the adjustment screen for test printing ends. Then, the adjustment screen for sheet information illustrated in FIG. 16 is displayed.

Next, with reference to FIG. 16, a test printing method is described. First, a case is described where the user performs printing based on past settings.

In FIG. 16, the user selects a combo box and inputs a predetermined test chart. In this case, as an example, the user presses a combo box 1510 for the glossiness/the black grade and selects "C:\abc\user_testchart1.pdf" as a test chart. A case is illustrated where user-specified test charts are already registered. Alternatively, the user may newly add a test chart.

Next, the user presses the "test print" button 1515. Consequently, the CPU 301 acquires a sheet list illustrated in FIG. 18 from the printing apparatus 103 and displays the acquired sheet list. A screen 1601 in FIG. 18 is a top screen of a sheet list screen.

In a table 1602, the sheet list is displayed. In the columns, attribute information of a sheet is set. In the rows, a sheet is set. To display attribute information other than that of the displayed sheets, the user operates a slider bar 1603 and thereby can display the attribute information. To display sheets other than the displayed sheets, the user operates a slider bar 1604 and thereby can the sheets. Then, in this case, the user selects plain paper 1, which is indicated by a highlighted area 1605, and presses an "OK" button 1607.

Consequently, the print control apparatus 102 reads the setting of an adjustment item for a test chart corresponding to the sheet name "plain paper 1" and the file name "C:\abc\user_testchart1.pdf" from the test chart list 1701 illustrated in FIG. 11.

Then, before test printing is performed, the CPU 301 confirms with the user whether to change the read setting of the adjustment item. If the user chooses not to change the setting of the adjustment item, the CPU 301 performs the test printing without any change. If, on the other hand, the user chooses to change the setting of the adjustment item, the CPU 301 opens the screen in FIG. 15, and the user changes the setting of the adjustment item. Then, the CPU 301 performs the test printing based on the changed setting. Further, the CPU 301 stores the changed setting of the adjustment item for the corresponding test chart in the test chart list 1701.

Also according to the present exemplary embodiment, after test information is stored and in a case where printing is performed using the same test information on another occasion or a case where a user wishes to read the same test information and set an adjustment item in the middle on another occasion, it is possible to save the trouble of adjusting the adjustment item.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-093379, filed May 9, 2017, which is hereby incorporated by reference herein in its entirety.

What is claimed is:

1. A print control apparatus capable of communicating with a printing apparatus, including a sheet holding unit in which a sheet to be used for printing is stored, for printing an image on the sheet stored in the sheet holding unit, the print control apparatus comprising:
   storage configured to store information regarding a test chart, wherein the information regarding a test chart includes a type of a sheet, an image to be used as a test chart, and a setting value of the printing apparatus in association with each other; and
   at least one processor which causes the print control apparatus to:
      select a type of a sheet to be used for printing by the printing apparatus;
      select the image to be used as a test chart;
      display a setting screen in which the setting value of the printing apparatus stored in the storage is reflected, the setting value being determined based on the selected type of a sheet and the selected image;
      set the setting value via the setting screen;
      determine whether a first type of test print or a second type of test print is to be performed for test printing in accordance with the set setting value;
      transmit, to the printing apparatus, a test printing instruction, the set setting value and designation information to designate a location in which an image is stored wherein the image is stored for test print in a case where it is determined the first type of test print is to be performed for the set setting value, and transmit a test printing instruction, the set setting value, and predetermined test print data in a case where it is determined the second type of test print is to be performed for the set setting value; and
      by transmitting the test printing instruction, instruct the printing apparatus such that the printing apparatus outputs at least one test print page in accordance with the test printing instruction wherein, in the first type of test print, the test print page is output based on the image stored in the location designated by the designation information, the selected type of the sheet and the set setting value in association with the selected type of the sheet, and, in the second type of test print, the test print page is output based on the predetermined test print data, the selected type of the sheet and the set setting value.

2. The print control apparatus according to claim 1, wherein the at least one processor causes the print control apparatus to:
display the set setting value.

3. The print control apparatus according to claim 2, wherein the at least one processor causes the print control apparatus to:
store a type of a sheet used for printing by the printing apparatus, an image printed on the sheet, and a setting value used to print the image on the sheet in association with each other in the storage.

4. The print control apparatus according to claim 2, wherein the at least one processor causes the print control apparatus to:
receive a user instruction for, based on the selected type of the sheet and the designated image, changing the setting value displayed on the display.

5. The print control apparatus according to claim 3, wherein the at least one processor causes the print control apparatus to:
receive a print instruction to print the selected image; and
based on the received print instruction, store the selected type of the sheet, the designated image with the designation information, and the set setting value in association with each other in the storage.

6. The print control apparatus according to claim 5, wherein in a case where the print instruction is given with a setting value different from the setting value stored in the storage in association with the selected type of the sheet and the designated image with the designation information, the at least one processor updates the setting value of the printing apparatus stored in the storage in association with the selected type of the sheet and the designated image.

7. The print control apparatus according to claim 1, wherein the at least one processor causes the print control apparatus to:
receive a print instruction to print the designated image with the designation information; and
based on the received print instruction, transmit the selected type of the sheet, the designated image, and the set setting value to the printing apparatus.

8. The print control apparatus according to claim 1, wherein the setting value of the printing apparatus is a setting value for adjusting a color or an image quality of the image to be printed by the printing apparatus.

9. The print control apparatus according to claim 1, wherein the image is image data stored in storage of the printing apparatus, or image data stored in the storage of the print control apparatus.

10. The print control apparatus according to claim 1, wherein the at least one processor causes the print control apparatus to:
after the setting value of the printing apparatus is changed, receive a user instruction to store the changed setting value; and
according to the received user instruction, transmit the changed setting value to the printing apparatus.

11. The print control apparatus according to claim 1, wherein the designation information is a file name of the image or an address where the image is stored.

12. The print control apparatus according to claim 1, wherein the at least one processor causes the print control apparatus to:
display on a single screen an area where the printing apparatus is set and an area where an input field for inputting the designation information to designate the location of the image to be used for printing is selected.

13. A control method for controlling a print control apparatus capable of communicating with a printing apparatus, including a sheet holding unit in which a sheet to be used for printing is held, for printing an image on the sheet held in the sheet holding unit, the print control apparatus including storage configured to store information regarding a test chart, wherein the information regarding a test chart includes a type of a sheet, an image to be used as a test chart, and a setting value of the printing apparatus in association with each other, the control method comprising:
selecting a type of a sheet to be used for printing by the printing apparatus;
selecting the image to be used as a test chart;
displaying a setting screen in which the setting value of the printing apparatus stored in the storage is reflected, the setting value being determined based on the selected type of a sheet and the selected image;
setting the setting value via the setting screen;
determining whether a first type of test print or a second type of test print is to be performed for test printing in accordance with the set setting value;
transmitting, to the printing apparatus, a test printing instruction, the set setting value and designation information to designate a location in which an image is stored wherein the image is stored for test print in a case where it is determined the first type of test print is to be performed for the set setting value, and transmit a test printing instruction, the set setting value, and predetermined test print data in a case where it is determined the second type of test print is to be performed for the set setting value; and
by transmitting the test printing instruction, instructing the printing apparatus such that the printing apparatus outputs at least one test print page in accordance with the test printing instruction wherein, in the first type of test print, the test print page is output based on the image stored in the location designated by the designation information, the selected type of the sheet and the set setting value in association with the selected type of the sheet, and, in the second type of test print, the test print page is output based on the predetermined test print data, the selected type of the sheet and the set setting value.

14. The print control apparatus according to claim 1, further comprising a user interface configured to input the destination information to designate the location in which the image is stored wherein the image is stored for test print,
wherein the at least one processor causes the print control apparatus to: transmit, to the printing apparatus, the test printing instruction and the designation information input by the user interface in a case where it is determined the first type of test print is to be performed for the set setting value.

15. The print control apparatus according to claim 1, further comprising a display configured to display a screen including, at least, a first adjustment item, a second adjustment item, a first selector for selecting an image used for test print for adjustment of the first adjustment item, and a second selector for selecting an image used for test print for adjustment of the second adjustment item.

\* \* \* \* \*